United States Patent
Sasaki

(10) Patent No.: US 7,410,747 B2
(45) Date of Patent: Aug. 12, 2008

(54) POSITIVE RESIST COMPOSITION AND PATTERN FORMING METHOD USING THE SAME

(75) Inventor: Tomoya Sasaki, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 120 days.

(21) Appl. No.: 11/234,187

(22) Filed: Sep. 26, 2005

(65) Prior Publication Data

US 2006/0068322 A1    Mar. 30, 2006

(30) Foreign Application Priority Data

Sep. 24, 2004    (JP)    ............ P. 2004-278320

(51) Int. Cl.
*G03F 7/039*    (2006.01)
(52) U.S. Cl. ............... 430/270.1; 430/176; 430/326; 430/907
(58) Field of Classification Search ............ 430/270.1, 430/176, 326, 907
See application file for complete search history.

(56) References Cited

U.S. PATENT DOCUMENTS

| | | | |
|---|---|---|---|
| 4,603,101 A | * | 7/1986 | Crivello ............ 430/270.1 |
| 4,678,737 A | * | 7/1987 | Schneller et al. ......... 430/270.1 |
| 5,300,404 A | * | 4/1994 | Tani et al. ............ 430/326 |
| 5,342,727 A | * | 8/1994 | Vicari et al. ............ 430/157 |
| 5,397,680 A | * | 3/1995 | Schadeli et al. ......... 430/270.1 |
| 5,541,263 A | * | 7/1996 | Thackeray et al. ....... 525/328.8 |
| 5,558,978 A | | 9/1996 | Schadeli et al. |
| 2003/0031952 A1 | * | 2/2003 | Harada et al. ............ 430/270.1 |
| 2003/0180653 A1 | * | 9/2003 | Ohsawa et al. ............ 430/170 |
| 2004/0087694 A1 | | 5/2004 | Nakao |
| 2005/0130444 A1 | * | 6/2005 | Rogalli et al. ............ 438/780 |
| 2005/0147916 A1 | * | 7/2005 | Yueh et al. ............ 430/270.1 |

FOREIGN PATENT DOCUMENTS

| | | | |
|---|---|---|---|
| EP | 0 102 450 A | | 3/1984 |
| EP | 0 404 206 A | | 12/1990 |
| EP | 0701171 A1 | * | 3/1996 |
| GB | 2360774 A | * | 10/2001 |
| JP | 6-41221 A | | 2/1994 |
| JP | 2000-122291 A | | 4/2000 |
| JP | 2000-241976 A | | 9/2000 |
| JP | 3173368 B2 | | 3/2001 |
| JP | 2001-114825 A | | 4/2001 |
| JP | 2001-206917 A | | 7/2001 |
| JP | 2002-202610 A | | 7/2002 |
| JP | 2002-323768 A | | 11/2002 |

OTHER PUBLICATIONS

European Search Report dated Dec. 7, 2005.

* cited by examiner

*Primary Examiner*—Cynthia Hamilton
(74) *Attorney, Agent, or Firm*—Sughrue Mion, PLLC

(57) ABSTRACT

A positive resist composition satisfying high sensitivity, high resolution and good line edge roughness at the same time, and a pattern forming method using the composition, are provided, which is a positive resist composition comprising (A) a resin of which solubility in an alkali developer increases under the action of an acid, the resin containing a repeating unit having a specific styrene skeleton and a repeating unit having a specific ring structure, and (B) a compound of generating an acid upon irradiation with actinic rays or radiation; and a pattern forming method using the composition.

20 Claims, No Drawings

POSITIVE RESIST COMPOSITION AND PATTERN FORMING METHOD USING THE SAME

BACKGROUND OF THE INVENTION

1. Field of the Invention

The present invention relates to a positive resist composition suitably used in the ultramicrolithography process of producing, for example, VLSI or high-capacity microchip or in other photofabrication processes. More specifically, the present invention relates to a positive photoresist capable of forming a highly refined pattern with use of electron beam, X-ray, EUV light or the like, that is, a positive resist composition suitably usable for fine processing of a semiconductor device, where electron beam, X-ray or EUV light (wavelength: around 13 nm) is used.

2. Background Art

In the process of producing a semiconductor device such as IC and LSI, fine processing by lithography using a resist composition has been conventionally performed. Recently, the integration degree of an integrated circuit is becoming higher and formation of an ultrafine pattern in the sub-micron or quarter-micron region is required. To cope with this requirement, the exposure wavelength also tends to become shorter, for example, from g line to i line or further to KrF excimer laser light. At present, development of lithography using electron beam, X ray or EUV light other than the excimer laser light is proceeding.

In particular, the electron beam lithography is positioned as a pattern forming technique of the next generation or second next generation and a high-sensitivity and high-resolution positive resist is being demanded. Among others, the elevation of sensitivity is a very important issue for shortening the wafer processing time, but in the positive resist for use with electron beam, when higher elevation is sought for, not only reduction of resolving power but also worsening of line edge roughness are brought about and development of a resist satisfying these properties at the same time is strongly demanded. The line edge roughness as used herein means that the edge of resist at the interface between the pattern and the substrate irregularly fluctuates in the direction perpendicular to the line direction due to the resist property and when the pattern is viewed from right above, the edge gives an uneven appearance. This unevenness is transferred in the etching step using the resist as a mask and causes deterioration of electric properties, giving rise to decrease in the yield. Particularly, in the ultrafine region of 0.25 µm or less, the improvement of line edge roughness is a very critical problem to be solved. High sensitivity, high resolution, good pattern profile and good line edge roughness are in a trade-off relationship, and it is very important how to satisfy these at the same time.

In the case of using EUV as a light source, the light is at a wavelength belonging to an extreme ultraviolet region and has a high energy and therefore, in corporation with a photochemical reaction such as negative conversion ascribable to EUV light, there arises a problem such as reduction of contrast. Accordingly, also in the lithography using X-ray or EUV light, an important issue is to satisfy high sensitivity as well as high resolution and the like at the same time. These problems are in need of resolution.

As for the resist suitable for such a lithography process using electron beam, X-ray or EUV light, a chemical amplification-type resist utilizing an acid catalytic reaction is mainly used from the standpoint of elevating the sensitivity and in the case of a positive resist, a chemical amplification-type resist composition mainly comprising an acid generator and a phenolic polymer which is insoluble or sparingly soluble in an alkali developer but becomes soluble in an alkali developer under the action of an acid (hereinafter simply referred to as a "phenolic acid-decomposable resin") is being effectively used.

With respect to this positive resist for use with electron beam, X-ray or EUV, some resist compositions which are variously designed, for example, formulated to contain a phenolic acid-decomposable resin, have been heretofore known (see, for example, Patent Documents 1 to 9: JP-A-2002-323768 (the term "JP-A" as used herein means an "unexamined published Japanese patent application"), JP-A-6-41221, Japanese Patent No. 3,173,368, JP-A-2000-122291, JP-A-2001-114825, JP-A-2001-206917, U.S. Pat. No. 5,558,978, JP-A-2002-202610, and JP-A-2000-241976, respectively).

However, it is impossible at present for any combination of these techniques to satisfy high sensitivity, high resolution, good line edge roughness and good pattern profile in an ultrafine region at the same time.

SUMMARY OF THE INVENTION

An object of the present invention is to solve the technical problem of enhancing performances in the microprocessing of a semiconductor device, preferably in the microprocessing using high-energy ray, X-ray, electron beam or EUV light, and provide a positive resist composition satisfying high sensitivity, high resolution and good line edge roughness at the same time.

The present inventors have made intensive studies, as a result, surprisingly, it has been found that the object of the present invention can be attained by a positive resist composition comprising (A) a specific phenolic acid-decomposable resin and (B) a compound of generating an acid upon irradiation with actinic rays or radiation.

That is, the present invention has been accomplished based on the following constitutions.

1. A positive resist composition comprising: (A) a resin of which solubility in an alkali developer increases under the action of an acid, the resin containing a repeating unit represented by formula (I) and a repeating unit having a cyclic structure in the main chain; and (B) a compound of generating an acid upon irradiation with actinic rays or radiation:

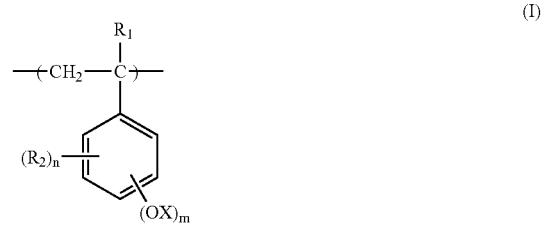

wherein $R_1$ represents a hydrogen atom, a methyl group, a cyano group, a halogen atom or a perfluoro group, $R_2$ represents a non-acid-decomposable group, and when n represents an integer of 2 to 4, a plurality of $R_2$s may be the same or difference, X represents a hydrogen atom or an organic group, and when m represents an integer of 2 to 4, a plurality of Xs may be the same or difference, m represents an integer of 1 to 4, and n represents an integer of 1 to 4, provided that $2 \leq n+m \leq 5$.

2. The positive resist composition as described in the item 1, wherein in the resin (A), the repeating unit having a cyclic structure in the main chain is a repeating unit represented by formula (II):

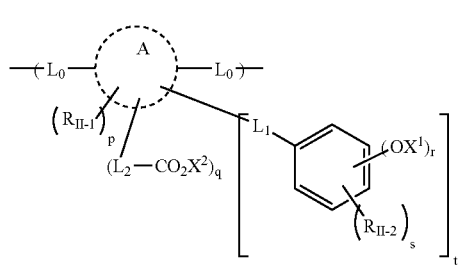

(II)

wherein $X^1$ and $X^2$ each independently represents a hydrogen atom or an organic group, and when r represents an integer of 2 to 5, a plurality of $X^1$s may be the same or difference, and when q represents an integer of 2 to 4, a plurality of $X^2$s may be the same or difference, A represents an atomic group of forming a ring structure by combining with a carbon atom in the main chain, $L_0$ each independently represents a single bond or a linking group represented by —$CH_2$— or —$CH_2CH_2$—, $R_{II\text{-}1}$ and $R_{II\text{-}2}$ each independently represents an alkyl group, a cycloalkyl group, a halogen atom, an aryl group, an aralkyl group, an alkoxy group or an acyloxy group, and said alkyl group and said aralkyl group each may have an intervening linking group represented by —O—, —S—, —$CO_2$—, —CO—, —$SO_2$— or —SO—, and when p represents an integer of 2 to 6, a plurality of $R_{II\text{-}1}$s may be the same or difference, and when s represents an integer of 2 to 5, a plurality of $R_{II\text{-}2}$s may be the same or difference, and a plurality of $R_{II\text{-}1}$s or a plurality of $R_{II\text{-}2}$s may combine with each other to form a ring structure, $L_1$ and $L_2$ each independently represents a single bond or a divalent linking group, and when t represents an integer of 2 to 4, a plurality of $L_1$s may be the same or difference, and when q represents an integer of 2 to 4, a plurality of $L_2$s may be the same or difference, p represents an integer of 0 to 6, q represents an integer of 0 to 4, r represents an integer of 0 to 5, s represents an integer of 0 to 5, provided that r+s is 5 or less, and when r and s each exists in a plural number, r's or s's may be the same or different, and t represents an integer of 0 to 4.

3. The positive resist composition as described in the item 2, wherein the repeating unit represented by formula (II) is a repeating unit represented by any one of formulae (IIa) to (IIe):

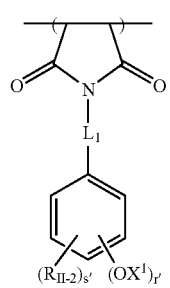

(IIa)

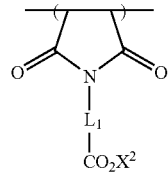

(IIb)

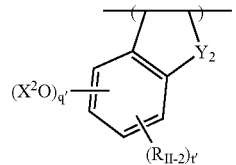

(IIc)

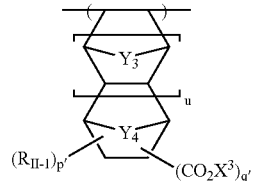

(IId)

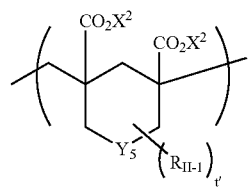

(IIe)

wherein $R_{II\text{-}1}$ and $R_{II\text{-}2}$ each independently represents an alkyl group, a cycloalkyl group, a halogen atom, an aryl group, an aralkyl group, an alkoxy group or an acyloxy group, and said alkyl group and said aralkyl group each may have an intervening linking group represented by —O—, —S—, —$CO_2$—, —CO—, —$SO_2$— or —SO—, and when p' or t' each represents an integer of 2 to 6 or 2 to 4, respectively, a plurality of $R_{II\text{-}1}$s may be the same or difference, and when s' or t' represents an integer of 2 to 5 or 2 to 4, respectively, a plurality of $R_{II\text{-}2}$s may be the same or difference, and a plurality of $R_{II\text{-}1}$s or a plurality of $R_{II\text{-}2}$s may combine with each other to form a ring structure, $L_1$ and $L_2$ each independently represents a single bond or a divalent linking group, $X^1$, $X^2$ and $X^3$ each independently represents a hydrogen atom or an organic group, and when r' represents an integer of 2 to 5, a plurality of $X^1$s may be the same or difference, and when q' represents an integer of 2 to 4, a plurality of $X^2$s may be the same or difference, and when q' represents an integer of 2 to 4, a plurality of $X^3$s may be the same or difference, $Y_2$ represents a divalent linking group, and $R_{II\text{-}2}$ and $Y_2$ may combine to form a ring structure, $Y_3$ and $Y_4$ each independently represents a linking group represented by —$CH_2$—, —O— or —$CH_2CH_2$—, $Y_5$ represents a linking group represented by —O—, —S— or —$C(R_m)(R_n)$—, and $R_m$ and $R_n$ each independently represents an alkyl group, a cycloalkyl group, a halogen atom, an aryl group, an aralkyl group, an alkoxy group or an acyloxy group, and said alkyl group and said aralkyl group each may have an intervening linking group represented by —O—, —S—, —$CO_2$—, —CO—, —$SO_2$— or —SO—, u represents 0 or 1, p' represents an integer of 0 to 6, q' each independently represents an integer of 0 to 4, r' represents an integer of 0 to 5, s' represents an integer of 0 to 5, and t' each independently represents an integer of 0 to 4, provided that r'+s' is 5 or less.

4. The positive resist composition as described in any one of the items 1 to 3, wherein the repeating unit represented by formula (I) is a repeating unit represented by formula (Ia):

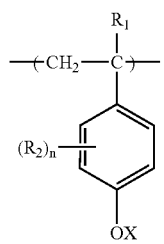

(Ia)

wherein $R_1$ represents a hydrogen atom, a methyl group, a cyano group, a halogen atom or a perfluoro group, $R_2$ represents a non-acid-decomposable group, X represents a hydrogen atom or an organic group, and n represents an integer of 1 to 4, and when n is an integer of 2 to 4, a plurality of $R_{2s}$ may be the same or different.

5. The positive resist composition as described in any one of the items 1 to 4, wherein the repeating unit represented by formula (I) is a repeating unit represented by formula (Ib):

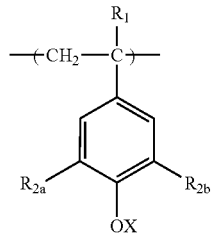

(Ib)

wherein $R_1$ represents a hydrogen atom, a methyl group, a cyano group, a halogen atom or a perfluoro group, X represents a hydrogen atom or an organic group, and $R_{2a}$ and $R_{2b}$ each independently represents a hydrogen atom or a non-acid-decomposable group, provided that at least one of $R_{2a}$ and $R_{2b}$ is a non-acid-decomposable group.

6. The positive resist composition as described in any one of the items 1 to 5, wherein the non-acid-decomposable group represented by $R_2$ in formula (I) contains an oxygen atom.

7. The positive resist composition as described in any one of the items 1 to 6, wherein the non-acid-decomposable group represented by $R_2$ in formula (I) contains a halogen atom.

8. The positive resist composition as described in any one of the items 2 to 7, wherein the repeating unit represented by formula (II) is a repeating unit represented by any one of formulae (IIa1) to (IIe1):

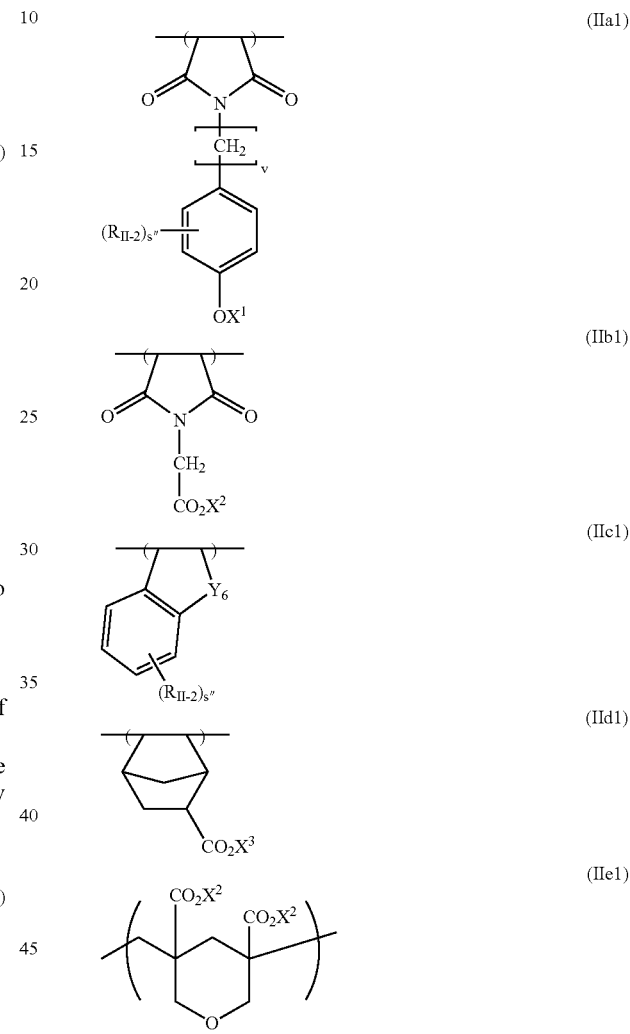

wherein $R_{II-2}$ each independently represents an alkyl group, a cycloalkyl group, a halogen atom, an aryl group, an aralkyl group, an alkoxy group or an acyloxy group, and said alkyl group and said aralkyl group each may have an intervening linking group represented by —O—, —S—, —$CO_2$—, —CO—, —$SO_2$— or —SO—, and when s" represents an integer of 2 to 4, a plurality of $R_{II-2}$s may be the same or difference, and a plurality of $R_{II-1}$s or a plurality of $R_{II-2}$s may combine with each other to form a ring structure, $X^1$, $X^2$ and $X^3$ each independently represents a hydrogen atom or an organic group, $Y_6$ represents a linking group represented by —$CH_2$— or —CO—O—, v represents 0 or 1, and s" each independently represents an integer of 0 to 4.

9. The positive resist composition as described in any one of the items 1 to 8, wherein the resin (A) further contains a repeating unit represented by formula (III):

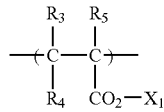
(III)

wherein
$R_3$ to $R_5$ each independently represents a hydrogen atom, a fluorine atom, a chlorine atom, a cyano group or an alkyl group, and
$X_1$ represents a hydrogen atom or an organic group.

10. The positive resist composition as described in any one of the items 1 to 9, wherein at least one of X in formula (I), $X_1$ and $X_2$ in formula (II) and $X_1$ in formula (III) contains at least one of an alicyclic structure and an aromatic ring structure.

11. The positive resist composition as described in any one of the items 1 to 10, wherein the non-acid-decomposable group represented by $R_2$ in formula (I) is an alkoxy group.

12. The positive resist composition as described in any one of the items 1 to 11, which further comprises a surfactant.

13. The positive resist composition as described in any one of the items 1 to 12, wherein the compound (B) includes (B1) a compound of generating an organic sulfonic acid under the action of actinic rays or radiation.

14. The positive resist composition as described in the item 13, which further comprises (B2) a compound of generating a carboxylic acid under the action of actinic rays or radiation.

15. The positive resist composition as described in any one of the items 1 to 14, which further comprises a solvent.

16. The positive resist composition as described in the item 15, wherein the solvent includes a propylene glycol monomethyl ether acetate.

17. The positive resist composition as described in the item 16, wherein the solvent further includes a propylene glycol monomethyl ether.

18. The positive resist composition as described in any one of the items 1 to 17, which is exposed by the irradiation of electron beam, X-ray or EUV.

19. A pattern forming method comprising forming a resist film by using the positive resist composition described in any one of the items 1 to 18; and exposing and developing said resist film.

According to the present invention, a positive resist composition usable for microprocessing of a semiconductor, preferably processing using high energy ray, X-ray, electron beam or EVU light, and capable of satisfying high sensitivity, high resolution, good line edge roughness and good pattern profile at the same time, and a pattern forming method using the composition are provided.

DETAILED DESCRIPTION OF THE INVENTION

The compounds for use in the present invention are described in detail below.

In the present invention, when a group (atomic group) is denoted without specifying whether substituted or unsubstituted, the group includes both a group having no substituent and a group having a substituent. For example, an "alkyl group" includes not only an alkyl group having no substituent (unsubstituted alkyl group) but also an alkyl group having a substituent (substituted alkyl group).

[1] (A) A Resin of which Solubility in an Alkali Developer Increases Under the Action of an Acid The resin (A) of which solubility in an alkali developer increases under the action of an acid, which is used in the present invention, contains a repeating unit represented by formula (I) and a repeating unit having a cyclic structure in the main chain.

The repeating unit having a cyclic structure in the main chain is preferably a repeating unit represented by formula (II):

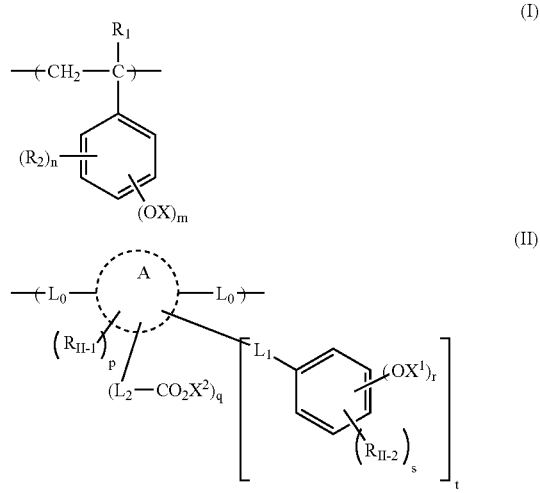

In formulae (I) and (II),
$R_1$ represents a hydrogen atom, a methyl group, a cyano group, a halogen atom or a perfluoro group,
$R_2$ represents, when exists in a plural number, each independently represents, a non-acid-decomposable group,
X, $X^1$ and $X^2$ each independently represents a hydrogen atom or an organic group,
m represents an integer of 1 to 4,
n represents an integer of 1 to 4, provided that $2 \leq n+m \leq 5$,
A represents an atomic group of forming a ring structure by combining with the carbon atom in the main chain,
$L_0$ each independently represents a single bond or a linking group represented by —$CH_2$— or —$CH_2CH_2$—,
$R_{II-1}$ and $R_{II-2}$ each independently represents an alkyl group, a cycloalkyl group, a halogen atom, an aryl group, an aralkyl group, an alkoxy group or an acyloxy group, provided that the alkyl group and the aralkyl group each may have an intervening linking group represented by —O—, —S—, —$CO_2$—, —CO—, —$SO_2$— or —SO— and that a plurality of $R_{II-1}$s or a plurality of $R_{II-2}$s may combine with each other to form a ring structure,
$L_1$ and $L_2$ each independently represents a single bond or a divalent linking group,
p represents an integer of 0 to 6,
q represents an integer of 0 to 4,
r represents an integer of 0 to 5,
s represents an integer of 0 to 5, provided that r+s is 5 or less and that when r and s each exists in a plural number, r's or s's may be the same or different, and
t represents an integer of 0 to 4.

The perfluoro group of $R_1$ is preferably a perfluoromethyl group or a perfluoroethyl group. $R_1$ is preferably a hydrogen atom, a methyl group or a $C_mF_{2m+1}$ group (m is preferably 1), more preferably a hydrogen atom or a methyl group.

$R_2$ represents a non-acid-decomposable group. The non-acid-decomposable group means a group which is not an acid-decomposable group (a group of decomposing under the action of an acid to generate an alkali-soluble group), that is, a group which does not produce an alkali-soluble group such as hydroxyl group and carboxyl group by decomposing under the action of an acid generated from a photoacid generator or the like upon exposure.

Examples of the non-acid-decomposable group of $R_2$ include a halogen atom, an alkyl group, a cycloalkyl group, an aryl group, an alkoxy group, an acyl group, —OC(=O)Ra, —OC(=O)ORa, —C(=O)ORa, —C(=O)N(Rb)Ra, —N(Rb)C(=O)Ra, —N(Rb)C(=O)ORa, —N(Rb)SO$_2$Ra, —SRa, —SO$_2$Ra, —SO$_3$Ra and —SO$_2$N(Rb)Ra. A hydrogen atom is not included in the non-acid-decomposable group. The non-acid-decomposable group of $R_2$ is preferably an alkoxy group.

Ra represents an alkyl group, a cycloalkyl group or an aryl group.

Rb represents a hydrogen atom, an alkyl group, a cycloalkyl group or an aryl group.

The alkyl group of $R_2$ is, for example, an alkyl group having a carbon number of 1 to 8 and specific preferred examples thereof include a methyl group, an ethyl group, a propyl group, an n-butyl group, a sec-butyl group, a hexyl group and an octyl group.

The cycloalkyl group of $R_2$ is, for example, a cycloalkyl group having a carbon number of 3 to 15 and specific preferred examples thereof include a cyclopentyl group, a cyclohexyl group, a norbornyl group and an adamantyl group.

The alkoxy group of $R_2$ is, for example, an alkoxy group having a carbon number 1 to 8 and examples thereof include a methoxy group, an ethoxy group, a propoxy group, a butoxy group, a pentyloxy group, a hexyloxy group and a cyclohexyloxy group.

The aryl group of $R_2$ is, for example, an aryl group having a carbon number of 6 to 15 and specific preferred examples thereof include a phenyl group, a tolyl group, a naphthyl group and an anthryl group.

The acyl group of $R_2$ is, for example, an acyl group having a carbon number of 2 to 8 and specific preferred examples thereof include a formyl group, an acetyl group, a propanoyl group, a butanoyl group, a pivaloyl group and a benzoyl group.

These groups each may have a substituent and preferred examples of the substituent include a hydroxyl group, a carboxyl group, a halogen atom (e.g., fluorine, chlorine, bromine, iodine) and an alkoxy group (e.g., methoxy, ethoxy, propoxy, butoxy). In the case of a cyclic structure, examples of the substituent further include an alkyl group (preferably having a carbon number of 1 to 8).

The alkyl group, cycloalkyl group and aryl group of Ra and Rb are the same as those described for $R_2$.

The organic group of X is preferably an organic group having a carbon number of 1 to 40 and may be an acid-decomposable group or a non-acid-decomposable group.

In the case of a non-acid-decomposable group, examples of the organic group include the same organic groups as those for the non-acid-decomposable group of $R_2$ (since this is an organic group, a halogen atom is not included).

Also, examples thereof include an alkyl group, a cycloalkyl group, an alkenyl group, an aryl group, an alkyloxy group (excluding —O-tertiary alkyl), an acyl group, a cycloalkyloxy group, an alkenyloxy group, an aryloxy group, an alkylcarbonyloxy group, an alkylamidomethyloxy group, an alkylamide group, an arylamidomethyl group and an arylamide group.

Of these non-acid-decomposable groups, preferred are an acyl group, an alkylcarbonyloxy group, an alkyloxy group, a cycloalkyloxy group, an aryloxy group, an alkylamideoxy group and an alkylamide group, and more preferred are an acyl group, an alkylcarbonyloxy group, an alkyloxy group, a cycloalkyloxy group and an aryloxy group.

In the non-acid-decomposable group, the alkyl group is preferably an alkyl group having a carbon number of 1 to 4, such as methyl group, ethyl group, propyl group, n-butyl group, sec-butyl group and tert-butyl group; the cycloalkyl group is preferably a cycloalkyl group having a carbon number of 3 to 10, such as cyclopropyl group, cyclobutyl group, cyclohexyl group and adamantyl group; the alkenyl group is preferably an alkenyl group having a carbon number of 2 to 4, such as vinyl group, propenyl group, allyl group and butenyl group; the aryl group is preferably an aryl group having a carbon number of 6 to 14, such as phenyl group, xylyl group, toluyl group, cumenyl group, naphthyl group and anthracenyl group; and the alkoxy group is preferably an alkoxy group having a carbon number of 1 to 4, such as methoxy group, ethoxy group, hydroxyethoxy group, propoxy group, hydroxypropoxy group, n-butoxy group, isobutoxy group and sec-butoxy group.

In the case of an acid-decomposable group, examples of the organic group of X include —C($R_{11a}$)($R_{12a}$)($R_{13a}$), —C($R_{14a}$)($R_{15a}$)(O$R_{16a}$) and —CO—OC($R_{11a}$)($R_{12a}$)($R_{13a}$).

$R_{11a}$ to $R_{13a}$ each independently represents an alkyl group, a cycloalkyl group, an alkenyl group, an aralkyl group or an aryl group. $R_{14a}$ and $R_{15a}$ each independently represents a hydrogen atom or an alkyl group. $R_{16a}$ represents an alkyl group, a cycloalkyl group, an alkenyl group, an aralkyl group or an aryl group. Two of $R_{11a}$, $R_{12a}$ and $R_{13a}$, or two of $R_{14a}$, $R_{15a}$ and $R_{16a}$ may combine to form a ring.

The alkyl group of $R_{11a}$ to $R_{16a}$ may have a substituent such as cycloalkyl group, hydroxy group, alkoxy group, oxo group, alkylcarbonyl group, alkyloxycarbonyl group, alkylcarbonyloxy group, alkylaminocarbonyl group, alkylcarbonylamino group, alkylsulfonyl group, alkylsulfonyloxy group, alkylsulfonylamino group, alkylaminosulfonyl group, aminosulfonyl group, halogen atom and cyano group.

The aryl group of $R_{11a}$ to $R_{13a}$ and $R_{16a}$ may have a substituent such as alkyl group, cycloalkyl group, hydroxy group, alkoxy group, oxo group, alkylcarbonyl group, alkyloxycarbonyl group, alkylcarbonyloxy group, alkylaminocarbonyl group, alkylcarbonylamino group, alkylsulfonyl group, alkylsulfonyloxy group, alkylsulfonylamino group, alkylaminosulfonyl group, aminosulfonyl group, halogen atom and cyano group.

The alkyl group, cycloalkyl group, alkenyl group and aralkyl group of $R_{11a}$ to $R_{16a}$ each may have an intervening ether group, thioether group, carbonyl group, ester group, amido group, urethane group, ureido group, sulfonyl group or sulfone group.

Incidentally, into X of formula (I), a group having an acid-decomposable group may also be introduced by modification. X having an acid-decomposable group thus introduced is represented, for example, by the following formula:

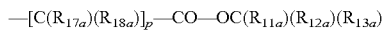

—[C($R_{17a}$)($R_{18a}$)]$_p$—CO—OC($R_{11a}$)($R_{12a}$)($R_{13a}$)

wherein $R_{17a}$ and $R_{18a}$ each independently represents a hydrogen atom or an alkyl group, and p represents an integer of 1 to 4.

The repeating unit represented by formula (I) is preferably a repeating unit represented by formula (Ia), more preferably a repeating unit represented by formula (Ib):

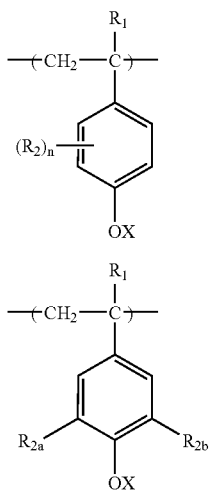

(Ia)

(Ib)

In these formulae, $R_1$, $R_2$, X and n have the same meanings as in formula (I).

In formula (Ib), $R_{2a}$ and $R_{2b}$ each is a hydrogen atom or a non-acid-decomposable group, provided that at least either one is a non-acid-decomposable group. The non-acid-decomposable group of $R_{2a}$ and $R_{2b}$ is the same as the non-acid-decomposable group of $R_2$ in formula (I).

Specific examples of the repeating unit represented by formula (I) include, but are not limited to, those contained in the resins used in Examples.

Examples of the organic group of $X^1$ and $X^2$ in formula (II) are the same as those for the organic group of X in formula (I).

The atomic group of A forms a ring structure together with the carbon atom constituting the main chain of the resin, and the ring structure formed may be monocyclic or polycyclic and may be an alicyclic ring, an aromatic ring or a heterocyclic ring. Examples of the alicyclic structure formable by A are the same as those of the alicyclic moiety which can be contained in the organic group of $X_1$ described later. Preferred examples of the aryl group formable by A include a phenol ring group, a xylyl group, a toluyl group, a cumenyl group, a naphthyl group and an anthracenyl group.

The total carbon number in the ring structure formed by A is preferably from 4 to 50, more preferably from 5 to 40. The ring structure formed by A may contain a group represented by —O—, —S—, —CO$_2$—, —CO—, —CON(Rx)—, —SO$_2$— or —SO—. Rx represents a hydrogen atom, an alkyl group or a cycloalkyl group.

Examples of the alkyl group, cycloalkyl group, aryl group and alkoxy group of $R_{II-1}$ and $R_{II-2}$ are the same as those for the non-acid-decomposable group of X in formula (I).

Examples of the halogen atom include a chlorine atom, a bromine atom, a fluorine atom and an iodine atom.

The aralkyl group is preferably an aralkyl group having a carbon number of 7 to 12, and examples thereof include a benzyl group, a phenethyl group and a naphthylmethyl group.

Examples of the acyloxy group include an acetoxy group.

A plurality of $R_{II-1}$s or a plurality of $R_{II-2}$s may combine with each other to form a ring structure, and the ring structure formed may be monocyclic or polycyclic and may be a cyclic hydrocarbon ring (e.g., alicyclic hydrocarbon group), an aromatic ring or a heterocyclic ring.

Examples of the alicyclic hydrocarbon group are the same as those of the alicyclic moiety which can be contained in the organic group of $X_1$ described later. Preferred examples of the aryl group include a phenyl group, a xylyl group, a toluyl group, a cumenyl group, a naphthyl group and an anthracenyl group.

Examples of the divalent linking group of $L_1$ and $L_2$ include an alkylene group, a cycloalkylene group, an alkenylene group, an arylene group, —O—, —S—, —O—$R_{22a}$—, —O—C(=O)—$R_{22b}$—, —C(=O)—O—$R_{22c}$— and —C(=O)—N($R_{22d}$)—$R_{22e}$—. $R_{22a}$, $R_{22b}$, $R_{22c}$ and $R_{22e}$ each represents a single bond or a divalent alkylene, cycloalkylene, alkenylene or arylene group which may have an ether group, an ester group, an amido group, a urethane group or a ureido group. $R_{22d}$ represents a hydrogen atom, an alkyl group (preferably having a carbon number of 1 to 5), a cycloalkyl group (preferably having a carbon number of 3 to 10), an aralkyl group (preferably having a carbon number of 7 to 10) or an aryl group (preferably having a carbon number of 6 to 10).

The alkylene group is preferably a linear or branched alkylene group having a carbon number of 1 to 8, and examples thereof include a methylene group, an ethylene group, a propylene group, a butylene group, a hexylene group and an octylene group.

The cycloalkylene group is preferably a cycloalkylene group having a carbon number of 5 to 12, and examples thereof include a monocyclic residue such as cyclopentylene group and cyclohexylene group, and a polycyclic residue such as norbornane skeleton and adamantane skeleton.

The alkenylene group is preferably an alkenylene group having a carbon number of 2 to 6, and examples thereof include an ethenylene group, a propenylene group and a butenylene group.

The arylene group is preferably an arylene group having a carbon number of 6 to 15, and examples thereof include a phenylene group, a tolylene group and a naphthylene group.

These groups each may further have a substituent, and examples of the substituent include an alkoxy group having a carbon number of 1 to 4 (e.g., methoxy, ethoxy, butoxy), a hydroxy group, an oxo group, an alkylcarbonyl group (preferably having a carbon number of 2 to 5), an alkylcarbonyloxy group (preferably having a carbon number of 2 to 5), an alkyloxycarbonyl group (preferably having a carbon number of 2 to 5) and a halogen atom (e.g., chlorine, bromine, fluorine).

The repeating unit represented by formula (II) is preferably a repeating unit represented by any one of formulae (IIa) to (IIe):

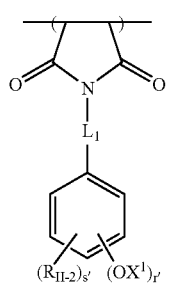

(IIa)

-continued

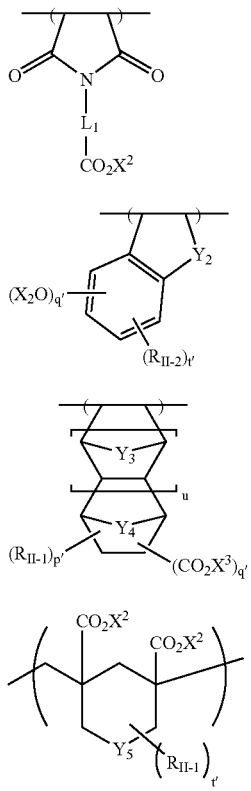

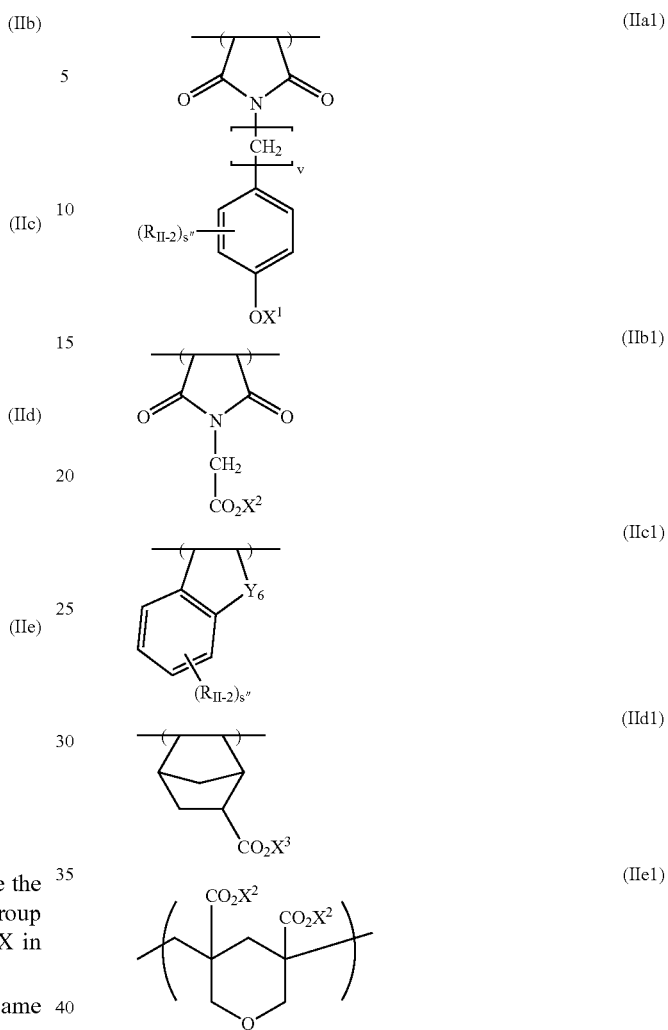

In formulae (IIa) to (IIe), $R_{II-1}$, $R_{II-2}$, $L_1$ and $L_2$ have the same meanings as in formula Examples of the organic group of $X^3$ are the same as those of the organic group for X in formula (I).

Examples of the divalent linking group of $Y_2$ are the same as those for $L_1$ in formula (II). The ring structure which may be formed by combining $R_{II-2}$ and $R_2$ may be monocyclic or polycyclic and may be an alicyclic hydrocarbon group or an aryl group. Examples of the alicyclic hydrocarbon group are the same as those of the alicyclic moiety which can be contained in the organic group of $X_1$ described later. Preferred examples of the aryl group include a phenyl group, a xylyl group, a toluyl group, a cumenyl group, a naphthyl group and an anthracenyl group.

$Y_5$ represents a linking group represented by —O—, —S— or —C($R_m$)($R_m$)—. $R_m$ and $R_n$ each independently represents an alkyl group, a cycloalkyl group, a halogen atom, an aryl group, an aralkyl group, an alkoxy group or an acyloxy group, provided that the alkyl group and the aralkyl group each may have an intervening linking group represented by —O—, —S—, —CO$_2$—, —CO—, —SO$_2$— or —SO—.

u represents 0 or 1, p' represents an integer of 0 to 6, q' each independently represents an integer of 0 to 4, r' represents an integer of 0 to 5, s' represents an integer of 0 to 5, and t' each independently represents an integer of 0 to 4, provided that r+s is 5 or less.

The repeating unit represented by formula (II) is more preferably a repeating unit represented by any one of formulae (IIa1) to (IIe1):

In formulae (IIa1) to (IIe1), $R_{II-1}$, $R_{II-2}$, $L_1$, $L_2$, $X^1$, $X^2$ and $X^3$ each has the same meaning as above, $Y_6$ represents a linking group represented by —CH$_2$— or —CO—O—, v represents 0 or 1, and s" each independently represents an integer of 0 to 4.

Specific examples of the repeating unit represented by formula (II) are set forth below, but the present invention is not limited thereto.

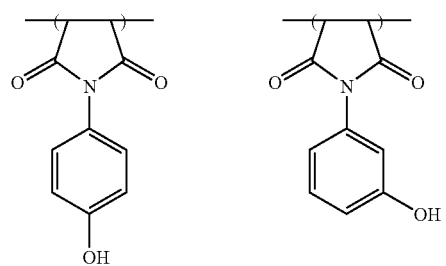

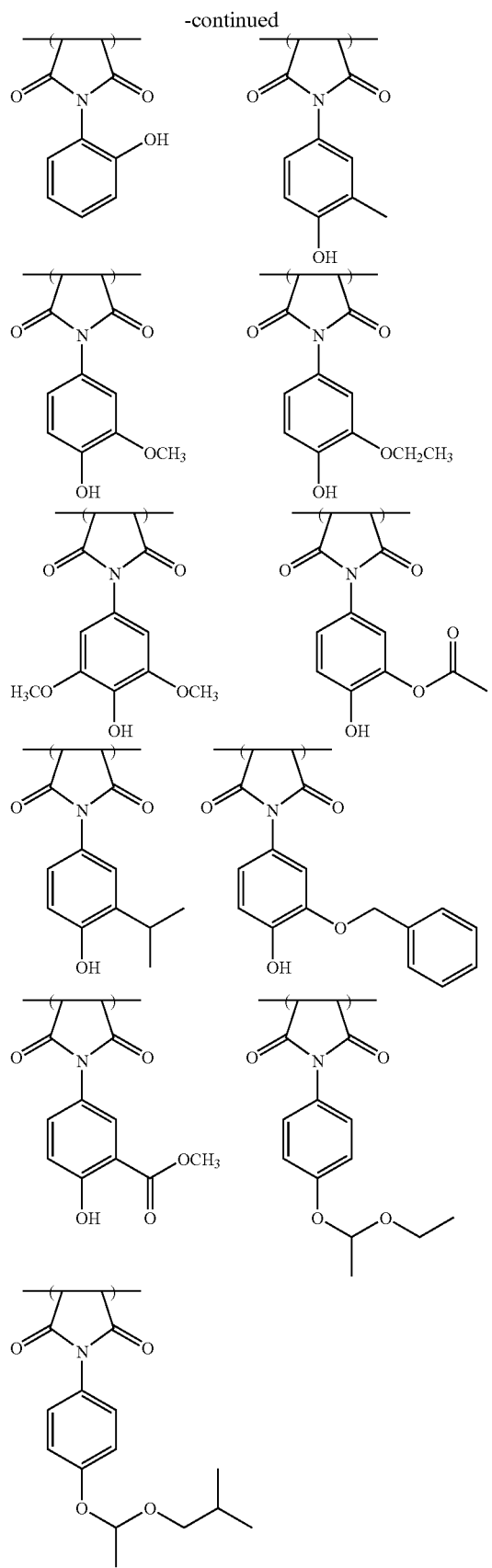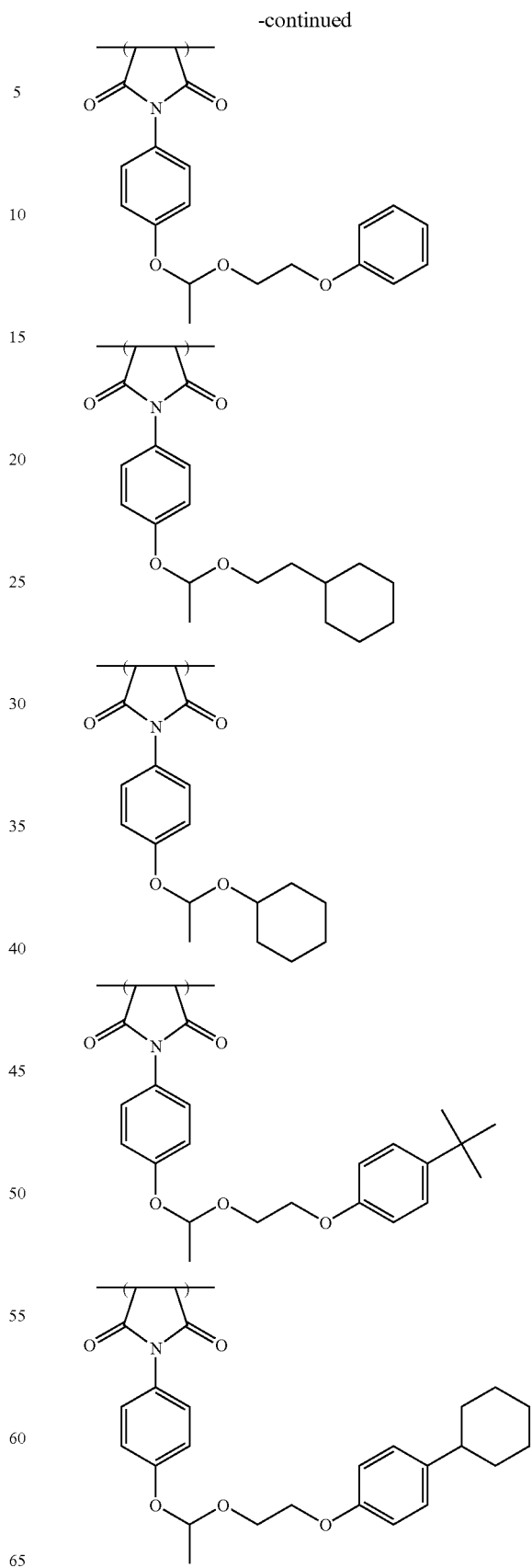

-continued
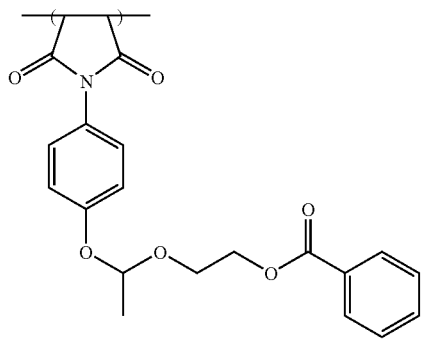
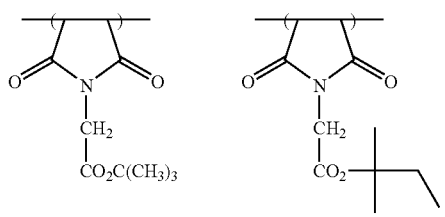
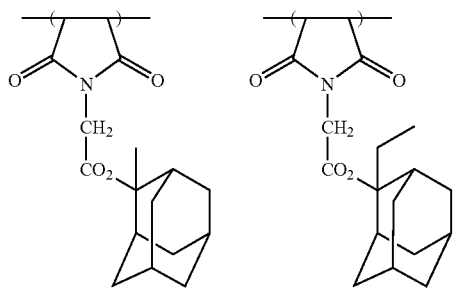
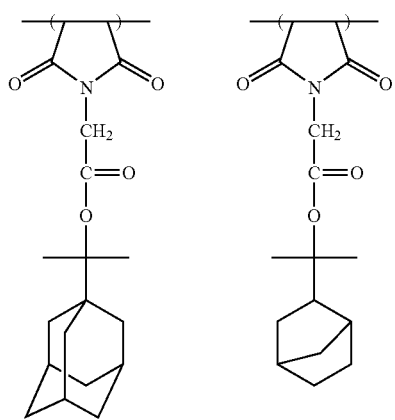
-continued
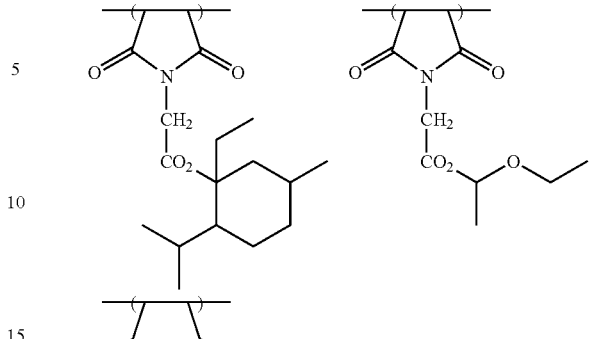
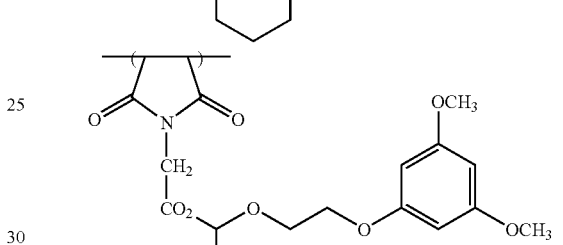
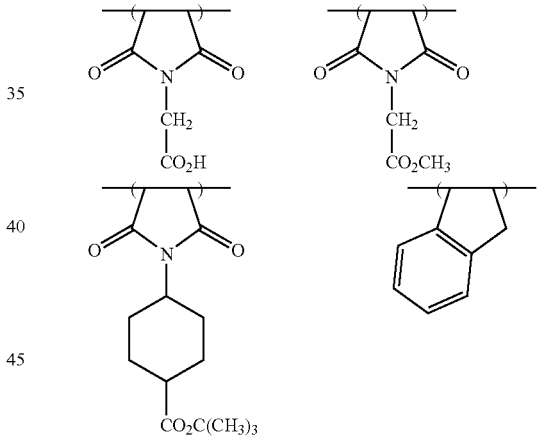
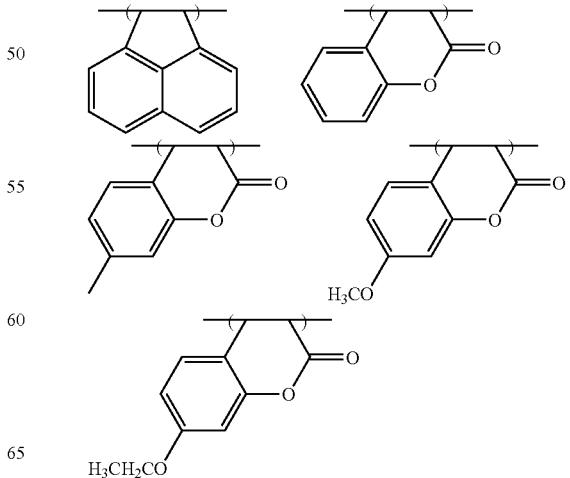

-continued
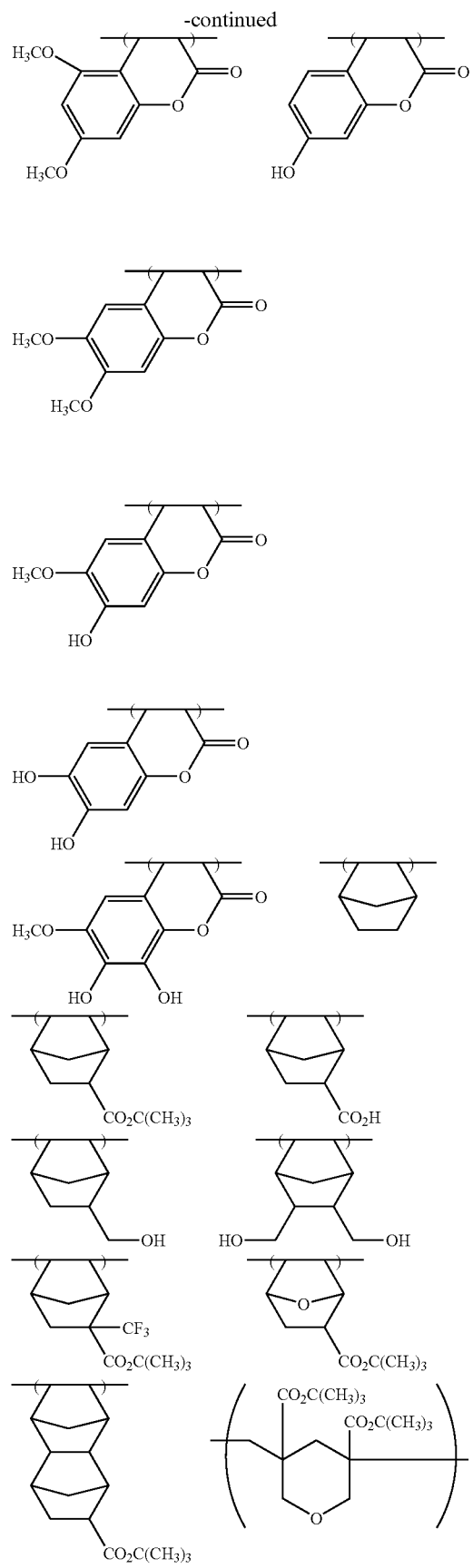
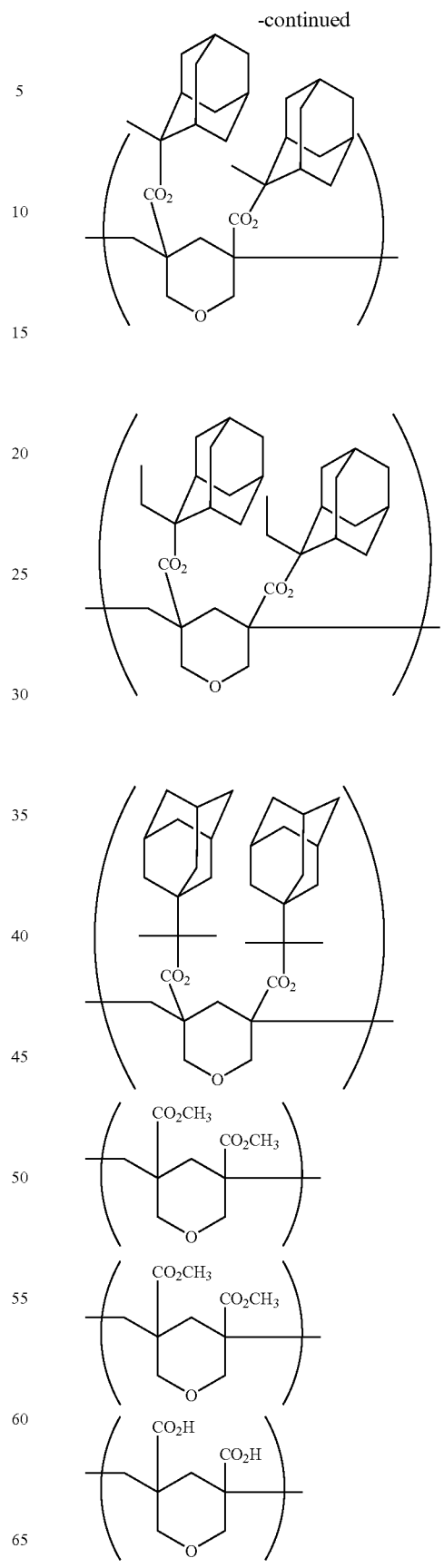

-continued

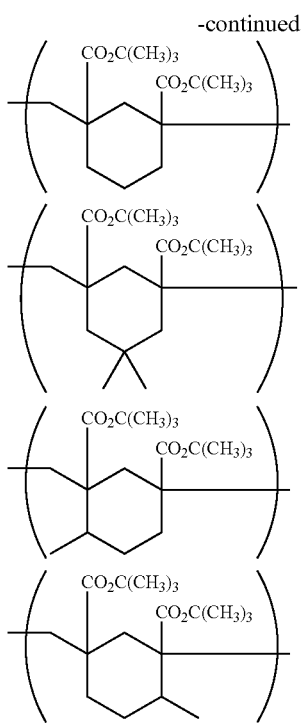

In addition to the repeating units represented by formulae (I) and (II), the resin (A) preferably contains a repeating unit represented by formula (III):

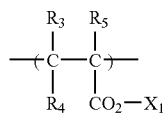
(III)

wherein $R_3$ to $R_5$ each independently represents a hydrogen atom, a fluorine atom, a chlorine atom, a cyano group or an alkyl group, and $X_1$ represents a hydrogen atom or an organic group.

The alkyl group of $R_3$ to $R_5$ is preferably an alkyl group having a carbon number of 1 to 5, and examples thereof include a methyl group, an ethyl group and a propyl group.

The organic group of $X_1$ is preferably an organic group having a carbon number of 1 to 40 and may be an acid-decomposable group or a non-acid-decomposable group.

In the case of a non-acid-decomposable group, examples of the organic group are the same as those of the organic group for the non-acid-decomposable group of $R_2$ (since this is an organic group, a halogen atom is not included).

Also, examples thereof include an alkyl group, a cycloalkyl group, an alkenyl group, an aryl group, an alkyloxy group (excluding —O-tertiary alkyl), an acyl group, a cycloalkyloxy group, an alkenyloxy group, an aryloxy group, an alkylcarbonyloxy group, an alkylamidomethyloxy group, an alkylamide group, an arylamidomethyl group and an arylamide group.

Of these non-acid-decomposable groups, preferred are an acyl group, an alkylcarbonyloxy group, an alkyloxy group, a cycloalkyloxy group, an aryloxy group, an alkylamideoxy group and an alkylamide group, and more preferred are an acyl group, an alkylcarbonyloxy group, an alkyloxy group, a cycloalkyloxy group and an aryloxy group.

In the non-acid-decomposable group, the alkyl group is preferably an alkyl group having a carbon number of 1 to 4, such as methyl group, ethyl group, propyl group, n-butyl group, sec-butyl group and tert-butyl group; the cycloalkyl group is preferably a cycloalkyl group having a carbon number of 3 to 10, such as cyclopropyl group, cyclobutyl group, cyclohexyl group and adamantyl group; the alkenyl group is preferably an alkenyl group having a carbon number of 2 to 4, such as vinyl group, propenyl group, allyl group and butenyl group; the aryl group is preferably an aryl group having a carbon number of 6 to 14, such as phenyl group, xylyl group, toluyl group, cumenyl group, naphthyl group and anthracenyl group; and the alkyloxy group is preferably an alkyloxy group having a carbon number of 1 to 4, such as methoxy group, ethoxy group, hydroxyethoxy group, propoxy group, hydroxypropoxy group, n-butoxy group, isobutoxy group and sec-butoxy group.

In the case of an acid-decomposable group, examples of the organic group of $X_1$ include —$C(R_{11a})(R_{12a})(R_{13a})$, —$C(R_{14a})(R_{15a})(OR_{16a})$ and —CO—$OC(R_{11a})(R_{12a})(R_{13a})$.

$R_{11a}$ to $R_{13a}$ each independently represents an alkyl group, a cycloalkyl group, an alkenyl group, an aralkyl group or an aryl group. $R_{14a}$ and $R_{15a}$ each independently represents a hydrogen atom or an alkyl group. $R_{16a}$ represents an alkyl group, a cycloalkyl group, an alkenyl group, an aralkyl group or an aryl group. Two of $R_{11a}$, $R_{12a}$ and $R_{13a}$, or two of $R_{14a}$, $R_{15a}$ and $R_{16a}$ may combine to form a ring.

The alkyl group of $R_{11a}$ to $R_{16a}$ may have a substituent such as cycloalkyl group, hydroxy group, alkoxy group, oxo group, alkylcarbonyl group, alkyloxycarbonyl group, alkylcarbonyloxy group, alkylaminocarbonyl group, alkylcarbonylamino group, alkylsulfonyl group, alkylsulfonyloxy group, alkylsulfonylamino group, alkylaminosulfonyl group, aminosulfonyl group, halogen atom and cyano group.

The aryl group of $R_{11a}$ to $R_{13a}$ and $R_{16a}$ may have a substituent such as alkyl group, cycloalkyl group, hydroxy group, alkoxy group, oxo group, alkylcarbonyl group, alkyloxycarbonyl group, alkylcarbonyloxy group, alkylaminocarbonyl group, alkylcarbonylamino group, alkylsulfonyl group, alkylsulfonyloxy group, alkylsulfonylamino group, alkylaminosulfonyl group, aminosulfonyl group, halogen atom and cyano group.

The alkyl group, cycloalkyl group, alkenyl group and aralkyl group of $R_{11a}$ to $R_{16a}$ each may have an intervening ether group, thioether group, carbonyl group, ester group, amido group, urethane group, ureido group, sulfonyl group or sulfone group.

Incidentally, a group having an acid-decomposable group may also be introduced into $X_1$ by modification. $X_1$ having thus introduced thereinto an acid-decomposable group is, for example, represented by the following formula:

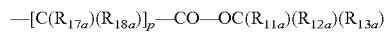

wherein $R_{17a}$ and $R_{18a}$ each independently represents a hydrogen atom or an alkyl group, and p represents an integer of 1 to 4.

The organic group of $X_1$ is preferably an acid-decomposable group having at least one cyclic structure selected from an alicyclic structure, an aromatic cyclic structure and a crosslinked alicyclic structure, and the structure is preferably a structure containing an aromatic group (particularly a phenyl group) or a structure containing an alicyclic or crosslinked alicyclic structure represented by any one of the following formulae (pI) to (pVI):

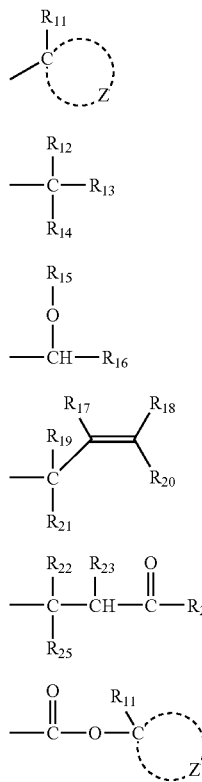

wherein $R_{11}$ represents a methyl group, an ethyl group, an n-propyl group, an isopropyl group, an n-butyl group, an isobutyl group or a sec-butyl group, Z represents an atomic group necessary for forming an alicyclic hydrocarbon group together with the carbon atom, $R_{12}$ to $R_{16}$ each independently represents a linear or branched alkyl group having a carbon number of 1 to 4 or an alicyclic hydrocarbon group, provided that at least one of $R_{12}$ to $R_{14}$ or either one of $R_{15}$ and $R_{16}$ represents an alicyclic hydrocarbon group, $R_{17}$ to $R_{21}$, each independently represents a hydrogen atom, a linear or branched alkyl group having a carbon number of 1 to 4 or an alicyclic hydrocarbon group, provided that at least one of $R_{17}$ to $R_{21}$ represents an alicyclic hydrocarbon group and that either one of $R_{19}$ and $R_{21}$ represents a linear or branched alkyl group having a carbon number of 1 to 4 or an alicyclic hydrocarbon group, $R_{22}$ to $R_{25}$ each independently represents a hydrogen atom, a linear or branched alkyl group having a carbon number of 1 to 4 or an alicyclic hydrocarbon group, provided that at least one of $R_{22}$ to $R_{25}$ represents an alicyclic hydrocarbon group and that $R_{23}$ and $R_{24}$ may combine with each other to form a ring.

In formulae (pI) to (pVI), the alkyl group of $R_{12}$ to $R_{25}$ is a linear or branched alkyl group having from 1 to 4 carbon atoms, which may be substituted or unsubstituted, and examples of the alkyl group include a methyl group, an ethyl group, an n-propyl group, an isopropyl group, an n-butyl group, an isobutyl group, a sec-butyl group and a tert-butyl group.

Examples of the substituent which the alkyl group may further have include an alkoxy group having a carbon number of 1 to 4, a halogen atom (e.g., fluorine, chlorine, bromine, iodine), an acyl group, an acyloxy group, a cyano group, a hydroxyl group, a carboxy group, an alkoxycarbonyl group and a nitro group.

The alicyclic hydrocarbon group of $R_{11}$ to $R_{25}$ and the alicyclic hydrocarbon group formed by Z together with the carbon atom each may be monocyclic or polycyclic. Specific examples thereof include a group having a monocyclic, bicyclic, tricyclic or tetracyclic structure with a carbon number of 5 or more. The carbon number thereof is preferably from 6 to 30, more preferably from 7 to 25. These alicyclic hydrocarbon groups each may have a substituent.

Examples of the structure of the alicyclic moiety in the alicyclic hydrocarbon group are set forth below.

(1)

(2)

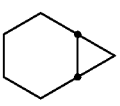
(3)

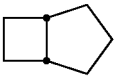
(4)

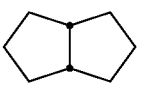
(5)

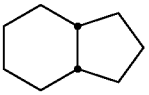
(6)

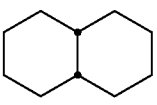
(7)

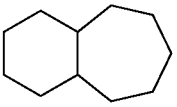
(8)

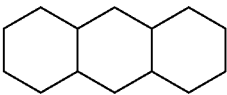
(9)

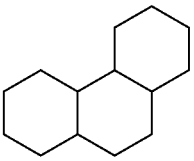
(10)

-continued
(11)
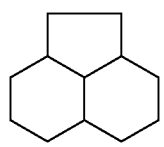
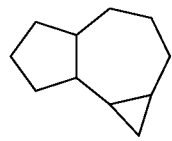
(12)
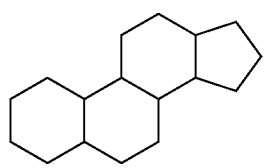
(13)
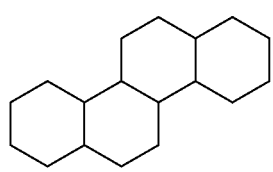
(14)
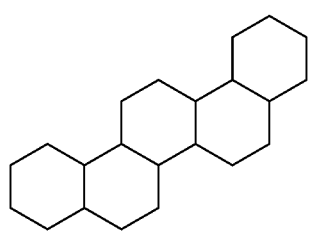
(15)
(16)
(17)
(18)
(19)
(20)
-continued
(21)
(22)
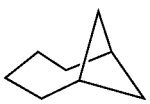
(23)
(24)
(25)
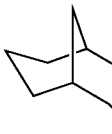
(26)
(27)
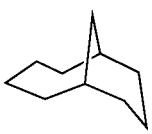
(28)
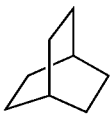
(29)
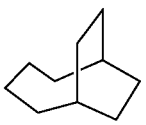
(30)
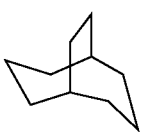
(31)
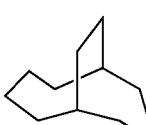
(32)
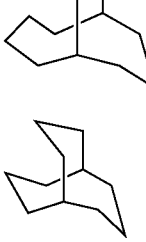

-continued

(33) 

(34) 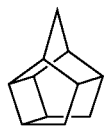

(35) 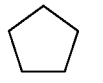

(36)

(37)

(38) 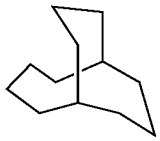

(39) 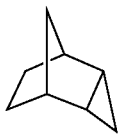

(40) 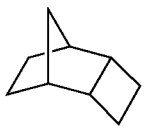

(41) 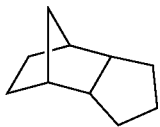

(42) 

(43) 

(44) 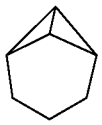

-continued (45)

(46) 

(47) 

(48)

(49)

(50)

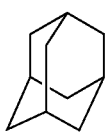
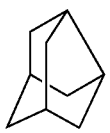
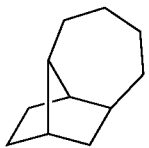
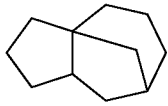

Among these alicyclic moieties, preferred in the present invention are an adamantyl group, a noradamantyl group, a decalin residue, a tricyclodecanyl group, a tetracyclododecanyl group, a norbornyl group, a cedrol group, a cyclohexyl group, a cycloheptyl group, a cyclooctyl group, a cyclodecanyl group and a cyclododecanyl group, more preferred are an adamantyl group, a decalin residue, a norbornyl group, a cedrol group, a cyclohexyl group, a cycloheptyl group, a cyclooctyl group, a cyclodecanyl group and a cyclododecanyl group.

Examples of the substituent which the alicyclic hydrocarbon group may have include an alkyl group, a halogen atom, a hydroxyl group, an alkoxy group, a carboxyl group and an alkoxycarbonyl group. The alkyl group is preferably a lower alkyl group such as methyl group, ethyl group, propyl group, isopropyl group and butyl group, more preferably a substituent selected from the group consisting of a methyl group, an ethyl group, a propyl group and an isopropyl group. The alkoxy group includes an alkoxy group having a carbon number of 1 to 4, such as methoxy group, ethoxy group, propoxy group and butoxy group.

The alkyl group, alkoxy group and alkoxycarbonyl group each may further have a substituent, and examples of the substituent include an alkoxy group having a carbon number of 1 to 4 (e.g., methoxy, ethoxy, butoxy), a hydroxy group, an oxo group, an alkylcarbonyl group (preferably having a carbon number of 2 to 5), an alkylcarbonyloxy group (preferably having a carbon number of 2 to 5), an alkyloxycarbonyl group (preferably having a carbon number of 2 to 5) and a halogen atom (e.g., chlorine, bromine, fluorine).

In the resin (A) of the present invention, at least any one of X in formula (I) and/or $X_1$ or $X_2$ in formula (II) and $X_1$ in formula (III) preferably contains an alicyclic structure and/or an aromatic ring structure.

In the resin (A), for maintaining good developability in an alkali developer, another appropriate polymerizable monomer may be copolymerized so that an alkali-soluble group such as phenolic hydroxyl group, carboxyl group, sulfonic acid group and hexafluoroisopropanol group ($-C(CF_3)_2OH$) can be introduced, or for enhancing the film property, another hydrophobic polymerizable monomer such as alkyl acrylate and alkyl methacrylate may be copolymerized.

The content of the repeating unit represented by formula (I) is preferably from 3 to 95 mol %, more preferably from 5 to 90 mol %, still more preferably from 10 to 85 mol %, based on all repeating units constituting the resin.

The content of the repeating unit represented by formula (II) is preferably from 1 to 90 mol %, more preferably from 3 to 80 mol %, still more preferably from 5 to 70 mol %, based on all repeating units constituting the resin.

The content of the repeating unit represented by formula (III) is preferably from 1 to 90 mol %, more preferably from 3 to 80 mol %, still more preferably from 5 to 70 mol %, based on all repeating units constituting the resin.

The content of the repeating unit having an alkali-soluble group such as hydroxyl group, carboxy group and sulfonic acid group is preferably from 1 to 99 mol %, more preferably from 3 to 95 mol %, still more preferably from 5 to 90 mol %, based on all repeating units constituting the resin.

The content of the repeating unit having an acid-decomposable group is preferably from 3 to 95 mol %, more preferably from 5 to 90 mol %, still more preferably from 10 to 85 mol %, based on all repeating units constituting the resin.

The resin can be synthesized by a known synthesis method such as a method of reacting an alkali-soluble resin with a precursor of a group capable of decomposing under the action of an acid, described in European Patent 254,853, JP-A-2-258500, JP-A-3-223860 and JP-A-251259, or a method of copolymerizing a monomer having a group capable of decomposing under the action of an acid with various monomers.

The weight average molecular weight (Mw) of the resin is preferably from 1,000 to 200,000, more preferably from 1,500 to 100,000, still more preferably from 2,000 to 50,000. If the weight average molecular weight is less than 1,000, there may arise a problem from the standpoint of preventing the film loss of unexposed area, and therefore, the weight average molecular weight is preferably 1,000 or more. Also, in view of dissolution rate of the resin itself in an alkali as well as sensitivity, the weight average molecular weight is preferably 200,000 or less. The molecular weight dispersity (Mw/Mn) is preferably from 1.0 to 4.0, more preferably from 1.0 to 3.0, still more preferably from 1.0 to 2.5.

The weight average molecular weight as used herein is defined by the polystyrene-reduced value according to gel permeation chromatography.

The resins (A) may be used in combination of two or more thereof.

The amount in total of the resin (A) added is usually from 10 to 96 mass %, preferably from 15 to 96 mass %, more preferably from 20 to 95 mass %, based on the entire solid content of the photosensitive composition.

Specific examples of the resin include, but are not limited to, those described in Examples.

[2] (B) A Compound of Generating an Acid Upon Irradiation with Actinic Rays or Radiation In the present invention, the compound (acid generator) of generating an acid upon irradiation with actinic rays or radiation may be appropriately selected from a photoinitiator for photocationic polymerization, a photoinitiator for photoradical polymerization, a photo-decoloring agent for dyes, a photo-discoloring agent, a known compound of generating an acid upon irradiation with actinic rays or radiation such as far ultraviolet ray (e.g., KrF, ArF excimer laser), $F_2$ excimer laser, electron beam, EVU and X-ray, which is used for microresist or the like, and a mixture thereof. Examples of the compound include diazonium salt, phosphonium salt, sulfonium salt, iodonium salt, imidosulfonate, oxime sulfonate, diazodisulfone, disulfone, o-nitrobenzylsulfonate.

Also, a compound where a group or compound of generating an acid upon irradiation with actinic rays or radiation is introduced into the main or side chain of a polymer, for example, compounds described in U.S. Pat. No. 3,849,137, German Patent 3,914,407, JP-A-63-26653, JP-A-55-164824, JP-A-62-69263, JP-A-63-146038, JP-A-63-163452, JP-A-62-153853 and JP-A-63-146029, may be used.

Furthermore, a compound of generating an acid under irradiation with light, for example, compounds described in U.S. Pat. No. 3,779,778 and European Patent 126,712, may also be used.

The content of the acid generator is usually from 0.001 to 40 mass %, preferably from 0.01 to 20 mass %, more preferably from 0.1 to 10 mass %, based on the entire solid content of the photosensitive composition. One of the acid generators may be used or two or more thereof may be mixed and used.

In the present invention, from the standpoint of enhancing the image performance such as resolving power and patter profile, (B1) a compound of generating an organic sulfonic acid upon irradiation with actinic rays or radiation (sulfonic acid generator) is preferred.

Preferred examples of the sulfonic acid generator include sulfonium salt, iodonium salt, imidosulfonate, oxime sulfonate, diazodisulfone and disulfone.

Among these, more preferred are the compounds set forth below.

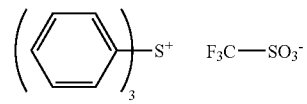

B-1

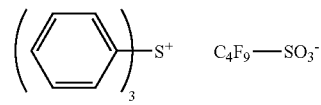

B-2

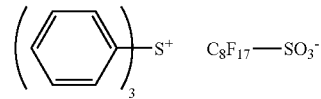

B-3

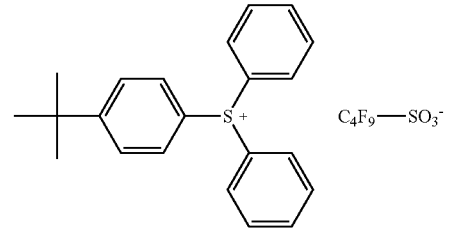

B-4

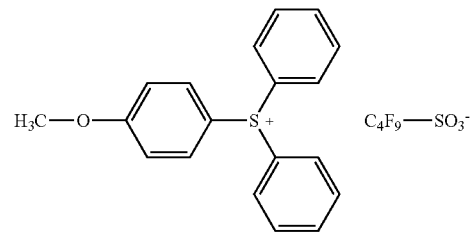

B-5

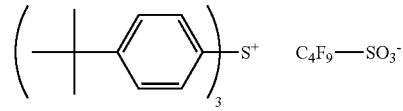

B-6

-continued
B-7
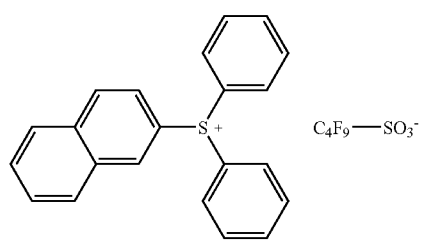
B-8
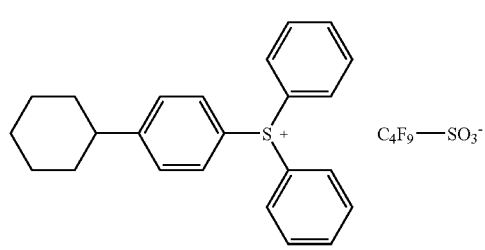
B-9
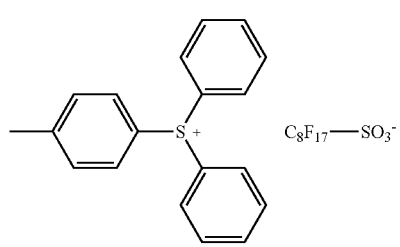
B-10
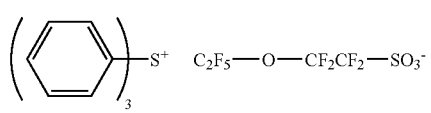
B-11
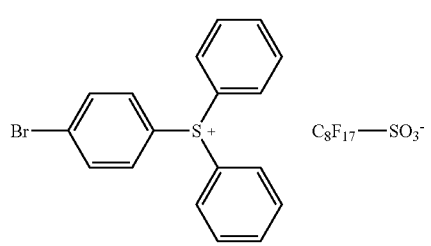
B-12
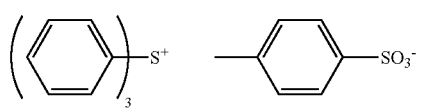
-continued
B-13
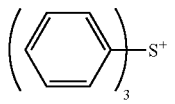
B-14
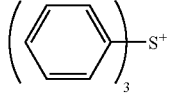
B-15
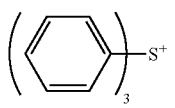
B-16
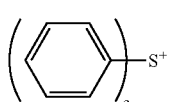
B-17
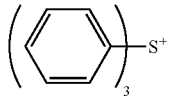
B-18
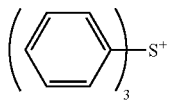
B-19
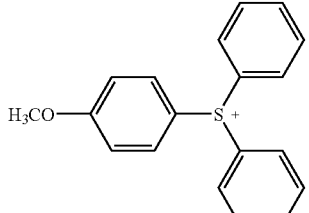
B-20
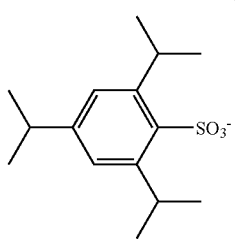

-continued
B-21
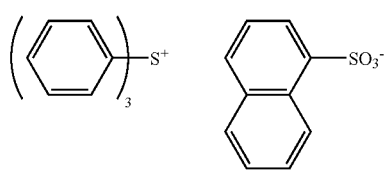
B-22
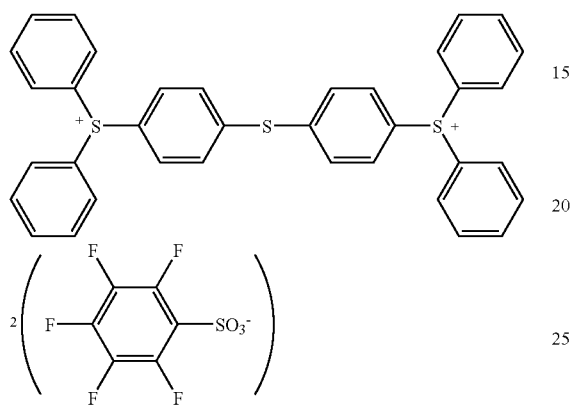
B-23
B-24
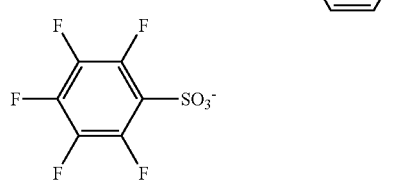
B-25
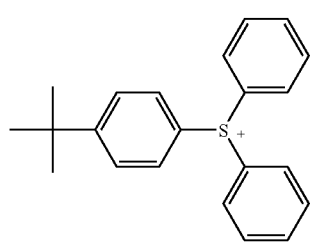
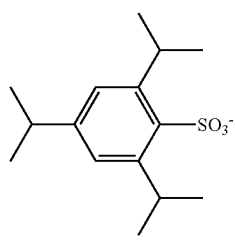
-continued
B-26
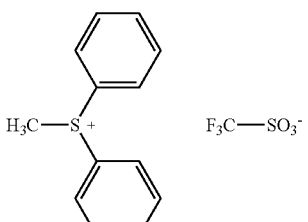
B-27
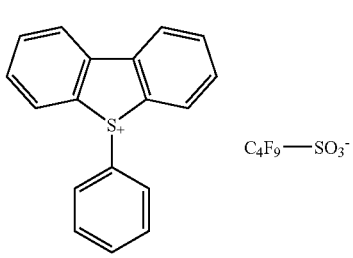
B-28
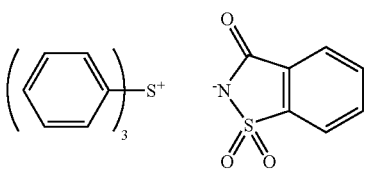
B-29
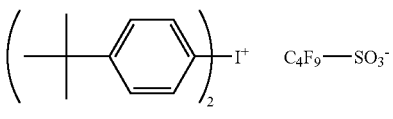
B-30
B-31
B-32
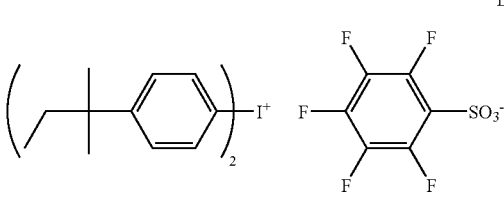
B-33

B-34
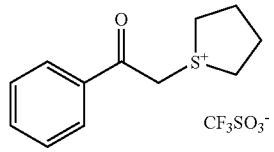
CF₃SO₃⁻
B-35
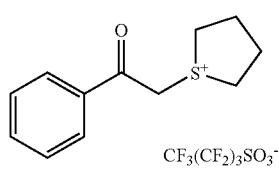
CF₃(CF₂)₃SO₃⁻
B-36
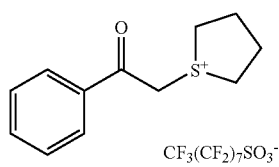
CF₃(CF₂)₇SO₃⁻
B-37
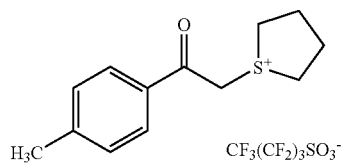
CF₃(CF₂)₃SO₃⁻
B-38
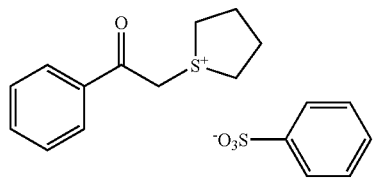
B-39
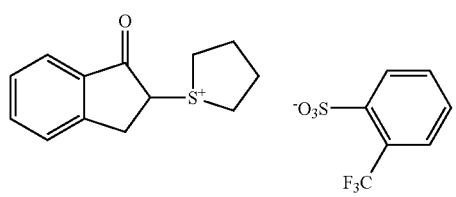
B-40
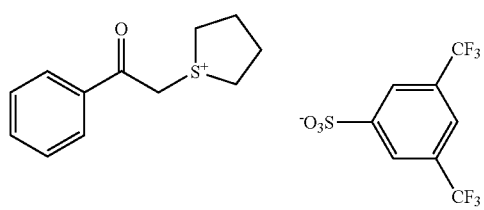
B-41
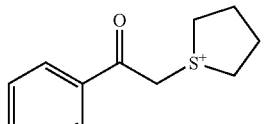
B-42
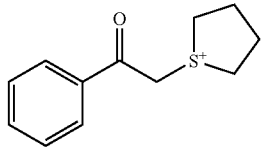
B-43
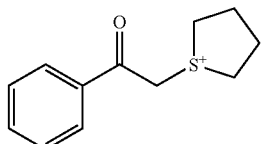
B-44
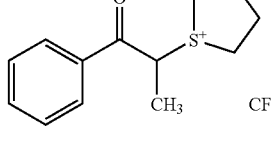
CF₃(CF₂)₃SO₃⁻
B-45
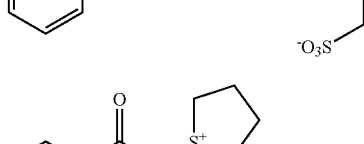
CF₃(CF₂)₃SO₃⁻
B-46
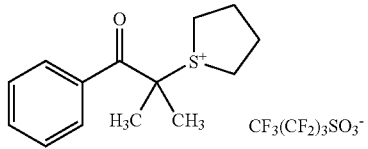
CF₃(CF₂)₃SO₃⁻
B-47
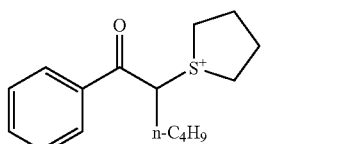
CF₃(CF₂)₃SO₃⁻
B-48
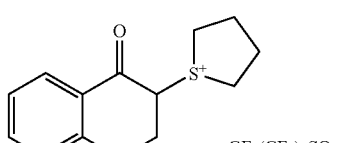
CF₃(CF₂)₃SO₃⁻
B-49
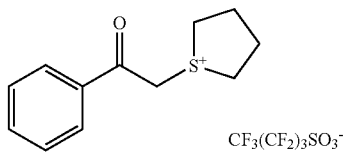
CF₃(CF₂)₃SO₃⁻

-continued
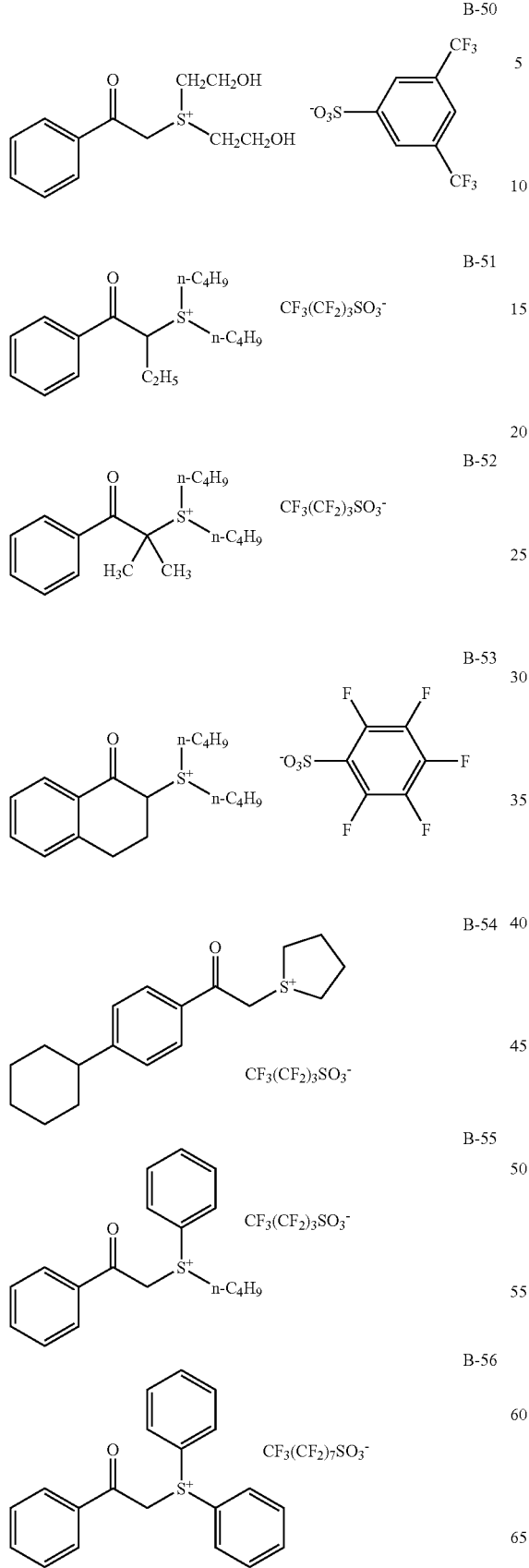
-continued
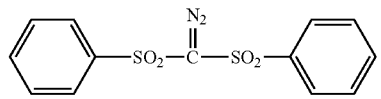
J-1
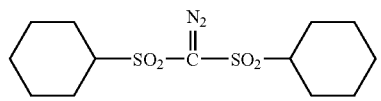
J-2
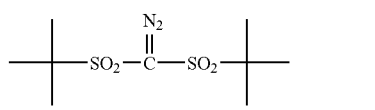
J-3
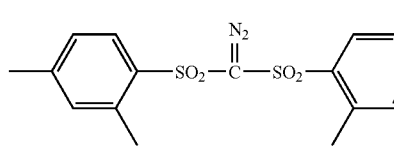
J-4
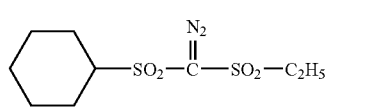
J-5
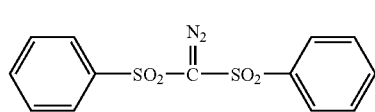
J-6
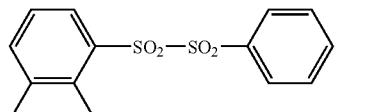
J-7
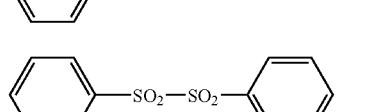
J-8
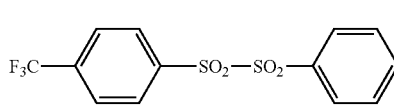
J-9
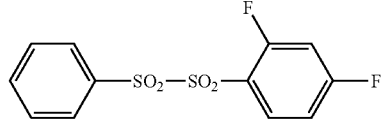
J-10
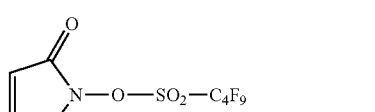
J-11
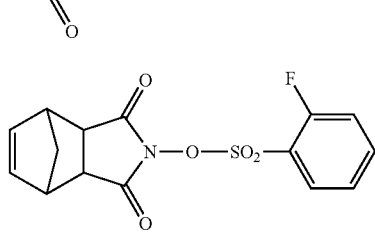
J-12

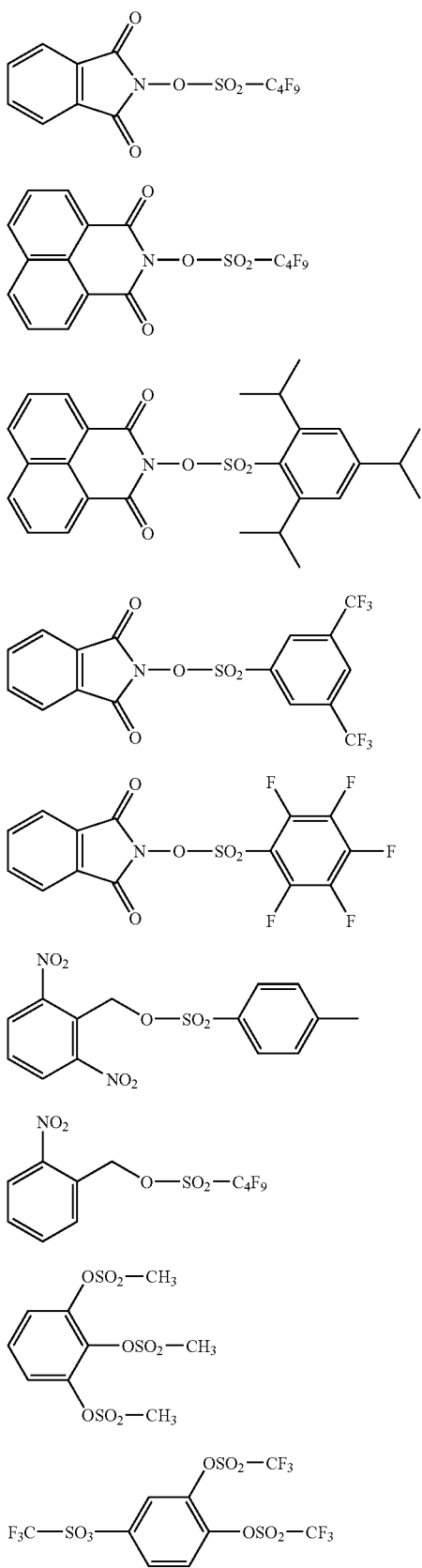

Also, by using the compound (B1) of generating an organic sulfonic acid upon irradiation with actinic rays or radiation (sulfonic acid generator) in combination with (B2) a compound of generating a carboxylic acid upon irradiation with actinic rays or radiation (carboxylic acid generator), contrast and line edge roughness are more enhanced.

The sulfonic acid generator/carboxylic acid generator (mass ratio) is usually from 1/1 to 100/1, preferably from 1/1 to 10/1. By using the acid generators in combination, the out-gas after exposure and the development defect are more decreased.

The carboxylic acid generator is preferably a compound (B2) represented by the following formula (BII):

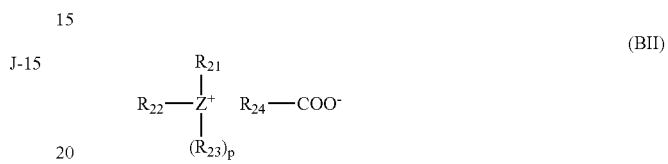

(BII)

wherein $R_{21}$ to $R_{23}$ each independently represents an alkyl group, an alkenyl group or an aryl group, $R_{24}$ represents a hydrogen atom, an alkyl group, an alkenyl group or an aryl group, Z represents a sulfur atom or an iodine atom, and p is 1 when Z is a sulfur atom, or 0 when Z is an iodine atom.

In formula (BII), $R_{21}$ to $R_{23}$ each independently represents an alkyl group, an alkenyl group or an aryl group, and these groups each may have a substituent.

The alkyl group, alkenyl group and aryl group of $R_{21}$ to $R_{23}$ each may have a substituent, and examples of the substituent for the alkyl group and alkenyl group include a halogen atom (e.g., chlorine, bromine, fluorine), an aryl group (e.g., phenyl, naphthyl), a hydroxy group and an alkoxy group (e.g., methoxy, ethoxy, butoxy). Examples of the substituent for the aryl group include a halogen atom (e.g., chlorine, bromine, fluorine), a nitro group, a cyano group, an alkyl group (e.g., methyl, ethyl, tert-butyl, tert-amyl, octyl), a hydroxy group and an alkoxy group (e.g., methoxy, ethoxy, butoxy).

$R_{21}$ to $R_{23}$ each is independently preferably an alkyl group having a carbon number of 1 to 12, an alkenyl group having a carbon number of 2 to 12 or an aryl group having a carbon number of 6 to 24, more preferably an alkyl group having a carbon number of 1 to 6 or an aryl group having a carbon number of 6 to 18, still more preferably an aryl group having a carbon number of 6 to 15, and these groups each may have a substituent.

$R_{24}$ represents a hydrogen atom, an alkyl group, an alkenyl group or an aryl group.

The alkyl group, alkenyl group and aryl group of $R^{24}$ each may have a substituent, and examples of the substituent for the alkyl group and alkenyl group are the same as those of the substituent described above when $R_{21}$ is an alkyl group. Examples of the substituent for the aryl group are the same as those of the substituent described above when $R_{21}$ is an aryl group.

$R_{24}$ is preferably a hydrogen atom, an alkyl group having a carbon number of 1 to 30, an alkenyl group having a carbon number of 2 to 30 or an aryl group having a carbon number of 6 to 24, more preferably an alkyl group having a carbon number of 1 to 18 or an aryl group having a carbon number of 6 to 18, still more preferably an alkyl group having a carbon number of 1 to 12 or an aryl group having a carbon number of 6 to 15.

Z represents a sulfur atom or an iodine atom. p is 1 when Z is a sulfur atom, or 0 when Z is an iodine atom.

Incidentally, two or more cation parts of formula (BII) may combine through a single bond or a linking group (e.g., —S—, —O—) to form a cation structure having a plurality of cation parts of formula (BII).

Specific preferred examples of the compound (B2) of generating a carboxylic acid upon irradiation with actinic rays or radiation are set forth below, but the present invention is of course not limited thereto.

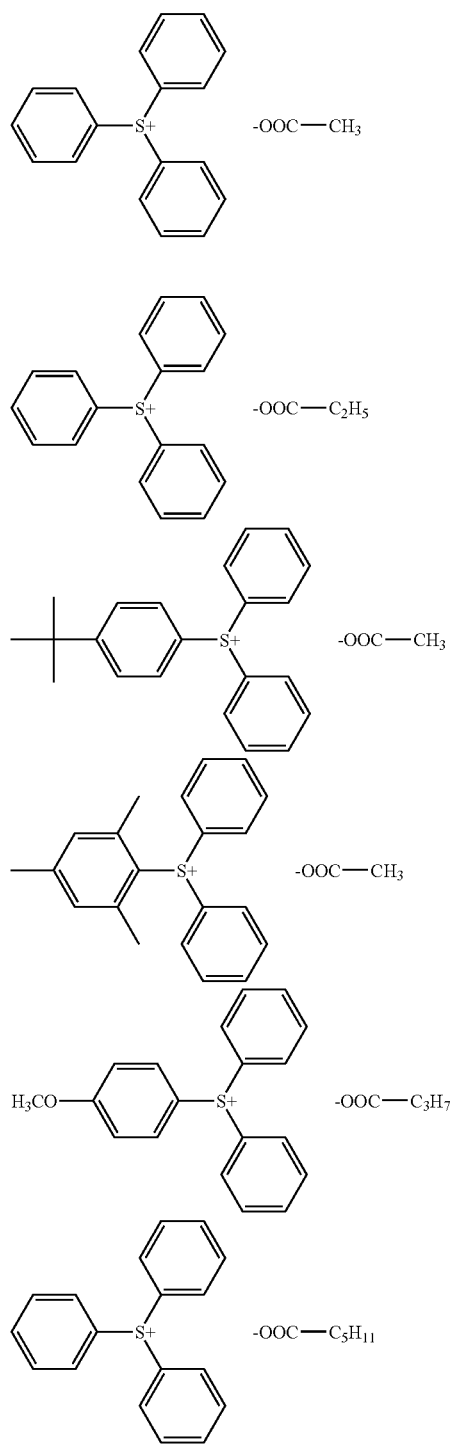

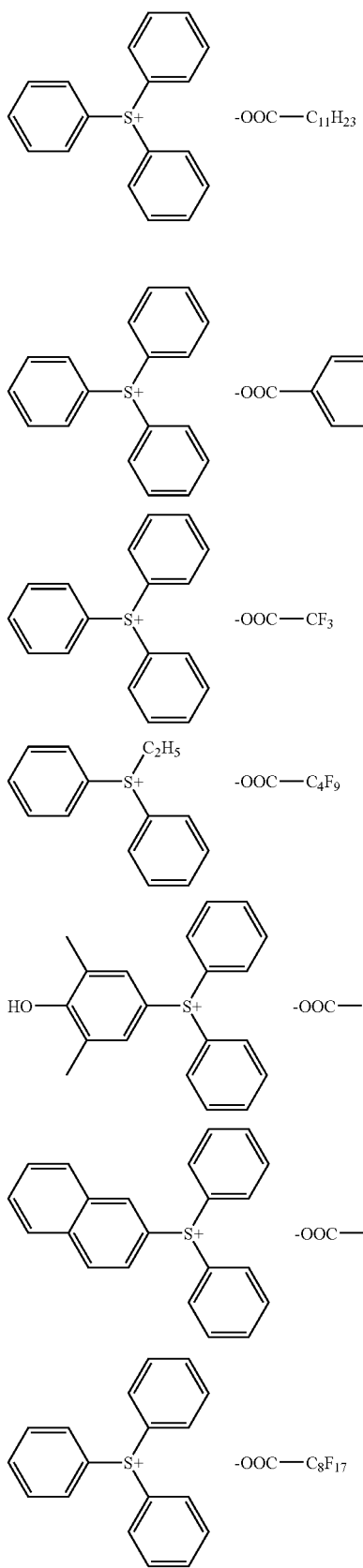

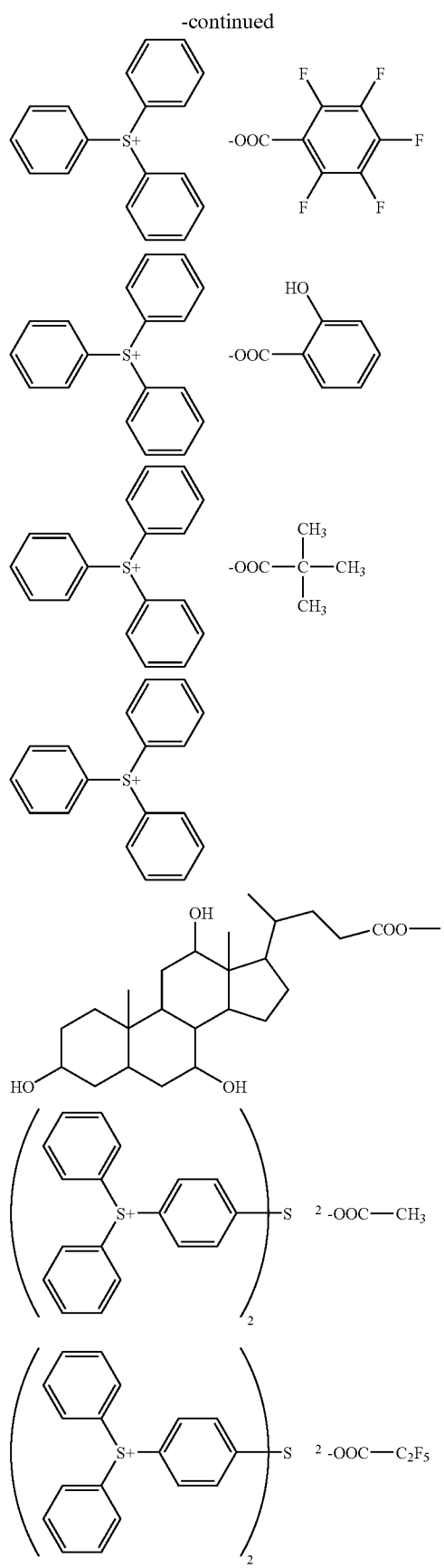

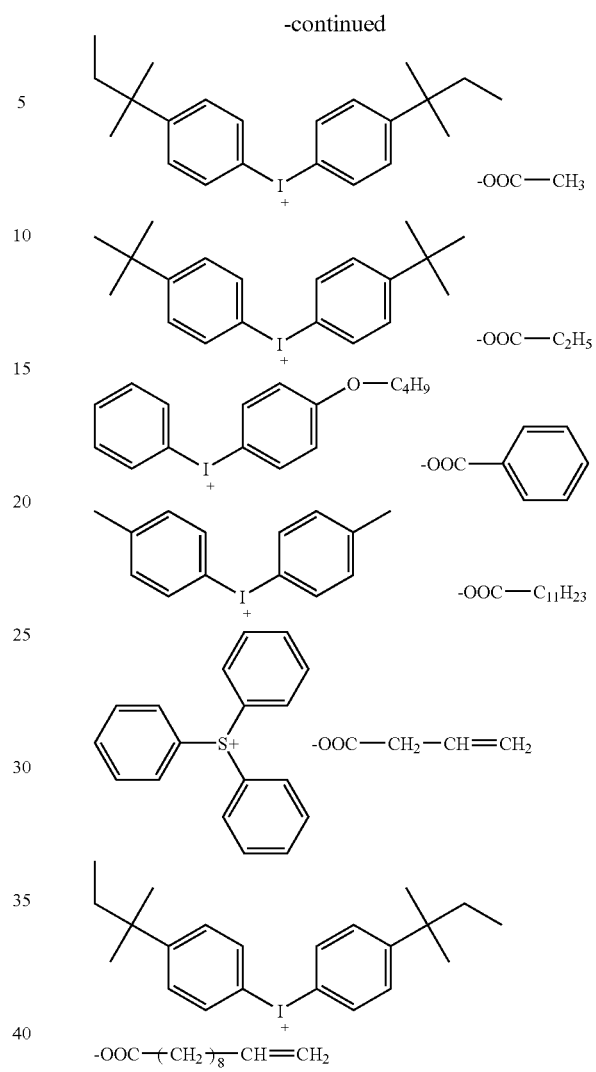

[3] Nitrogen-Containing Basic Compound (C)

In the present invention, a nitrogen-containing basic compound is preferably used from the standpoint of, for example, enhancing the performance such as resolving power or elevating the storage stability.

The nitrogen-containing basic compound usable in the present invention is preferably a compound having basicity stronger than phenol.

The preferred chemical environment thereof includes structures of the following formulae (A) to (E). The structures of formulae (B) to (E) each may form a part of a ring structure.

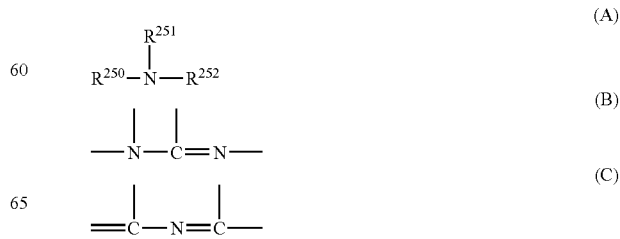

-continued

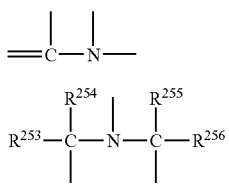

In these formulae, $R^{250}$, $R^{251}$ and $R^{252}$ each independently represents a hydrogen atom, an alkyl group having a carbon number of 1 to 20, a cycloalkyl group having a carbon number of 3 to 20 or an aryl group having a carbon number of 6 to 20, and $R^{250}$ and $R^{251}$ may combine with each other to form a ring. These groups each may have a substituent, and the alkyl or cycloalkyl group having a substituent is preferably an aminoalkyl group (having a carbon number of 1 to 20) or aminocycloalkyl group (having a carbon number of 3 to 20), or a hydroxyalkyl group (having a carbon number of 1 to 20) or hydroxycycloalkyl group (having a carbon number of 3 to 20).

Also, these groups each may contain, in its alkyl chain, an oxygen atom, a sulfur atom or a nitrogen atom.

$R^{253}$, $R^{254}$, $R^{255}$ and $R^{256}$ each independently represents an alkyl group having a carbon number of 1 to 6 or a cycloalkyl group having a carbon number of 3 to 6.

The compound is more preferably a nitrogen-containing basic compound having two or more nitrogen atoms differing in the chemical environment within one molecule, still more preferably a compound containing both an amino group and a ring structure containing a nitrogen atom, or a compound containing an alkylamino group.

Specific preferred examples thereof include guanidine, aminopyridine, aminoalkylpyridine, aminopyrrolidine, indazole, imidazole, pyrazole, pyrazine, pyrimidine, purine, imidazoline, pyrazoline, piperazine, aminomorpholine and aminoalkylmorpholine. These compounds each may have a substituent, and preferred examples of the substituent include an amino group, an aminoalkyl group, an alkylamino group, an aminoaryl group, an arylamino group, an alkyl group, an alkoxy group, an acyl group, an acyloxy group, an aryl group, an aryloxy group, a nitro group, a hydroxyl group and a cyano group.

Particularly preferred examples of the compound include, but are not limited to, guanidine, 1,1-dimethylguanidine, 1,1,3,3-tetramethylguanidine, imidazole, 2-methylimidazole, 4-methylimidazole, N-methylimidazole, 2-phenylimidazole, 4,5-diphenylimidazole, 2,4,5-triphenylimidazole, 2-aminopyridine, 3-aminopyridine, 4-aminopyridine, 2-dimethylaminopyridine, 4-dimethylaminopyridine, 2-diethylaminopyridine, 2-(aminomethyl)pyridine, 2-amino-3-methylpyridine, 2-amino-4-methylpyridine, 2-amino-5-methylpyridine, 2-amino-6-methylpyridine, 3-aminoethylpyridine, 4-aminoethylpyridine, 3-aminopyrrolidine, piperazine, N-(2-aminoethyl)piperazine, N-(2-aminoethyl)piperidine, 4-amino-2,2,6,6-tetramethylpiperidine, 4-piperidinopiperidine, 2-iminopiperidine, 1-(2-aminoethyl)pyrrolidine, pyrazole, 3-amino-5-methylpyrazole, 5-amino-3-methyl-1-p-tolylpyrazole, pyrazine, 2-(aminomethyl)-5-methylpyrazine, pyrimidine, 2,4-diaminopyrimidine, 4,6-dihydroxypyrimidine, 2-pyrazoline, 3-pyrazoline, N-aminomorpholine and N-(2-aminoethyl)morpholine.

A tetraalkylammonium salt-type nitrogen-containing basic compound can also be used.

Among such compounds, a tetraalkylammonium hydroxide having a carbon number of 1 to 8 (e.g., tetramethylammonium hydroxide, tetraethylammonium hydroxide, tetra-(n-butyl)ammonium hydroxide) is preferred.

These nitrogen-containing basic compounds are used individually or in combination of two or more thereof.

As for the ratio of the acid generator and the nitrogen-containing basic compound used in the composition, the (total amount of acid generator)/(nitrogen-containing basic compound) (by mol) is preferably 2.5 or more in view of sensitivity and resolving power, and preferably 300 or less from the aspect of resist pattern in aging after exposure until heat treatment and resolving power. The (acid generator)/(nitrogen-containing basic compound) (by mol) is more preferably from 5.0 to 200, still more preferably from 7.0 to 150.

[4] Surfactants

In the present invention, surfactants can be used and use thereof is preferred in view of film-forming property, adhesion of pattern, reduction in development defects, and the like.

Specific examples of the surfactant include a nonionic surfactant such as polyoxyethylene alkyl ethers (e.g., polyoxyethylene lauryl ether, polyoxyethylene stearyl ether, polyoxyethylene cetyl ether, polyoxyethylene oleyl ether), polyoxyethylene alkylallyl ethers (e.g., polyoxyethylene octylphenol ether, polyoxyethylene nonylphenol ether), polyoxyethylene-polyoxypropylene block copolymers, sorbitan fatty acid esters (e.g., sorbitan monolaurate, sorbitan monopalmitate, sorbitan monostearate, sorbitan monooleate, sorbitan trioleate, sorbitan tristearate) and polyoxyethylene sorbitan fatty acid esters (e.g., polyoxyethylene sorbitan monolaurate, polyoxyethylene sorbitan monopalmitate, polyoxyethylene sorbitan monostearate, polyoxyethylene sorbitan trioleate, polyoxyethylene sorbitan tristearate); a fluorine-containing or silicon-containing surfactant such as EFtop EF301, EF303, EF352 (produced by Shin Akita Chemical Co., Ltd.), Megafac F171, F173 (produced by Dainippon Ink & Chemicals, Inc.), Florad FC430, FC431 (produced by Sumitomo 3M Inc.), Asahiguard AG710, Surflon S-382, SC101, SC102, SC103, SC04, SC105 and SC106 (produced by Asahi Glass Co., Ltd.) and Troysol S-366 (produced by Troy Chemical Industries, Inc.); organosiloxane polymer KP-341 (produced by Shin-Etsu Chemical Co., Ltd.); and acrylic acid-based or methacrylic acid-based (co) polymer Polyflow No. 75 and No. 95 (produced by Kyoeisha Yushi Kagaku Kogyo). The amount of the surfactant blended is usually 2 parts by mass or less, preferably 1 part by mass or less, per 100 parts by mass of the solid content in the composition of the present invention.

These surfactants may be used individually or some of them may be added in combination.

As for the surfactant, the composition preferably contains any one of fluorine- and/or silicon-containing surfactants (a fluorine-containing surfactant, a silicon-containing surfactant or a surfactant containing both a fluorine atom and a silicon atom), or two or more thereof.

Examples of such surfactants include the surfactants described in JP-A-62-36663, JP-A-61-226746, JP-A-61-226745, JP-A-62-170950, JP-A-63-34540, JP-A-7-230165, JP-A-8-62834, JP-A-9-54432, JP-A-9-5988, JP-A-2002-277862 and U.S. Pat. Nos. 5,405,720, 5,360,692, 5,529,881, 5,296,330, 5,436,098, 5,576,143, 5,294,511 and 5,824,451. The following commercially available surfactants each may also be used as-is.

Examples of the commercially available surfactant which can be used include a fluorine-containing or silicon-containing surfactant such as EFtop EF301 and EF303 (produced by Shin-Akita Chemical Co., Ltd.), Florad FC430 and 431 (produced by Sumitomo 3M Inc.), Megafac F171, F173, F176, F189 and R08 (produced by Dainippon Ink & Chemicals, Inc.), Surflon S-382, SC101, 102, 103, 104, 105 and 106 (produced by Asahi. Glass Co., Ltd.), and Troysol S-366 (produced by Troy Chemical Industries, Inc.). In addition, polysiloxane polymer KP-341 (produced by Shin-Etsu Chemical Co., Ltd.) may also be used as a silicon-containing surfactant.

Other than those known surfactants, a surfactant using a polymer having a fluoro-aliphatic group which is derived from a fluoro-aliphatic compound produced by a telomerization process (also called a telomer process) or an oligomerization process (also called an oligomer process) may be used. The fluoro-aliphatic compound can be synthesized by the method described in JP-A-2002-90991.

The polymer having a fluoro-aliphatic group is preferably a copolymer of a fluoro-aliphatic group-containing monomer with (poly(oxyalkylene)) acrylate and/or (poly(oxyalkylene)) methacrylate, and the polymer may have an irregular distribution or may be block-copolymerized. Examples of the poly(oxyalkylene) group include a poly(oxyethylene) group, a poly(oxypropylene) group and a poly(oxybutylene) group. This group may also be a unit having alkylenes differing in the chain length within the same chain, such as block-linked poly(oxyethylene, oxypropylene and oxyethylene) and block-linked poly(oxyethylene and oxypropylene). Furthermore, the copolymer of a fluoro-aliphatic group-containing monomer and a (poly(oxyalkylene)) acrylate (or methacrylate) may be not only a binary copolymer but also a ternary or higher copolymer obtained by simultaneously copolymerizing two or more different fluoro-aliphatic group-containing monomers or two or more different (poly(oxyalkylene)) acrylates (or methacrylates).

Examples thereof include commercially available surfactants such as Megafac F178, F-470, F-473, F-475, F-476 and F-472 (produced by Dainippon Ink & Chemicals, Inc.), and further include a copolymer of an acrylate (or methacrylate) having $C_6F_{13}$ group and a (poly(oxyalkylene)) acrylate (or methacrylate), a copolymer of an acrylate (or methacrylate) having $C_6F_{13}$ group, a (poly(oxyethylene)) acrylate (or methacrylate) and a (poly(oxypropylene)) acrylate (or methacrylate), a copolymer of an acrylate (or methacrylate) having $C_8F_{17}$ group and a (poly(oxyalkylene)) acrylate (or methacrylate), and a copolymer of an acrylate (or methacrylate) having $C_8F_{17}$ group, a (poly(oxyethylene)) acrylate (or methacrylate) and a (poly(oxypropylene)) acrylate (or methacrylate).

The amount of the surfactant used is preferably from 0.0001 to 2 mass %, more preferably from 0.001 to 1 mass %, based on the entire amount of the photosensitive composition (excluding solvent).

[5] Other Components

The photosensitive composition of the present invention may further contain, if desired, a dye, a photo-base generator and the like.

1. Dye

In the present invention, a dye can be used.

A suitable dye includes an oily dye and a basic dye. Specific examples thereof include Oil Yellow #101, Oil Yellow #103, Oil Pink #312, Oil Green BG, Oil Blue BOS, Oil Blue #603, Oil Black BY, Oil Black BS, Oil Black T-505 (all produced by Orient Chemical Industries Co., Ltd.), Crystal Violet (CI42555), Methyl Violet (CI42535), Rhodamine B (CI45170B), Malachite Green (CI42000) and Methylene Blue (CI52015).

2. Photo-Base Generator

Examples of the photo-base generator which can be added to the composition of the present invention include the compounds described in JP-A-4-151156, JP-A-4-162040, JP-A-5-197148, JP-A-5-5995, JP-A-6-194834, JP-A-8-146608, JP-A-10-83079 and European Patent 622,682. Specific examples of the photo-base generator which can be suitably used include 2-nitrobenzyl carbamate, 2,5-dinitrobenzylcyclohexyl carbamate, N-cyclohexyl-4-methylphenylsulfonamide and 1,1-dimethyl-2-phenylethyl-N-isopropyl carbamate. The photo-base generator is added for the purpose of improving the resist profile or the like.

3. Solvents

The photosensitive composition of the present invention is dissolved in a solvent capable of dissolving respective components described above and then coated on a support. Usually, the concentration is, in terms of the entire solid content concentration of the photosensitive composition, preferably from 2 to 30 mass %, more preferably from 3 to 25 mass %.

Preferred examples of the solvent used here include ethylene dichloride, cyclohexanone, cyclopentanone, 2-heptanone, γ-butyrolactone, methyl ethyl ketone, ethylene glycol monomethyl ether, ethylene glycol monoethyl ether, 2-methoxyethyl acetate, ethylene glycol monoethyl ether acetate, propylene glycol monomethyl ether, propylene glycol monomethyl ether acetate, toluene, ethyl acetate, methyl lactate, ethyl lactate, methyl methoxypropionate, ethyl ethoxypropionate, methylpyruvate, ethyl pyruvate, propyl pyruvate, N,N-dimethylformamide, dimethylsulfoxide, N-methylpyrrolidone and tetrahydrofuran. These solvents are used individually or in combination of two or more thereof. The solvent preferably contains propylene glycol monomethyl ether acetate (PGMEA), more preferably propylene glycol monomethyl ether (PGME).

The photosensitive composition of the present invention is coated on a substrate to form a thin film. The thickness of this coating film is preferably from 0.05 to 4.0 μm.

In the present invention, a commercially available inorganic or organic antireflection film may be used, if desired. Furthermore, an antireflection film may be used by coating it as a lower layer of the photosensitive film formed of the photosensitive composition.

The antireflection film may be either an inorganic film such as titanium, titanium dioxide, titanium nitride, chromium oxide, carbon and amorphous silicon, or an organic film comprising a light absorbent and a polymer material. The former requires equipment for the film formation, such as vacuum deposition apparatus, CVD apparatus and sputtering apparatus. Examples of the organic antireflection film include a film comprising a diphenylamine derivative and formaldehyde-modified melamine resin condensate, an alkali-soluble resin and a light absorbent described in JP-B-7-69611 (the term "JP-B" as used herein means an "examined Japanese patent publication"), a reaction product of a maleic anhydride copolymer and a diamine-type light absorbent described in U.S. Pat. No. 5,294,680, a film comprising a resin binder and a methylolmelamine-based heat crosslinking agent described in JP-A-6-118631, an acrylic resin-type antireflection film containing a carboxylic acid group, an epoxy group and a light absorbing group within the same molecule described in JP-A-6-118656, a film comprising methylolmelamine and a benzophenone-based light absorbent described in JP-A-8-87115, and a film obtained by adding a low molecular light absorbent to a polyvinyl alcohol resin described in JP-A-8-179509.

Also, the organic antireflection film may be a commercially available organic antireflection film such as DTV-30 Series, DTV-40 Series (produced by Brewer Science, Inc.), AR-2, AR-3 and AR-5 (produced by Shipley Co., Ltd.).

In the production or the like of a precision integrated circuit device, the step of forming a pattern on a photosensitive film is performed by coating the photosensitive composition of the present invention on a substrate (for example, a silicon/silicon dioxide-coated substrate, a glass substrate, an ITO substrate or a quartz/chromium oxide-coated substrate), drying or baking it to form a photosensitive film, irradiating the photosensitive film with actinic rays or radiation such as far ultraviolet ray (e.g., KrF, ArF excimer laser), $F_2$ excimer laser, electron beam, EUV or X-ray, preferably heating it, and then subjecting the photosensitive film to development, rinsing and drying, whereby a good pattern can be formed.

The photosensitive composition of the present invention is preferably exposed by electron beam or EUV.

The alkali developer which can be used in the development is an aqueous solution of an alkali (usually, 0.1 to 20 mass %) such as inorganic alkalis (e.g., sodium hydroxide, potassium hydroxide, sodium carbonate, sodium silicate, sodium metasilicate, aqueous ammonia), primary amines (e.g., ethylamine, n-propylamine), secondary amines (e.g., diethylamine, di-n-butylamine), tertiary amines (e.g., triethylamine, methyldiethylamine), alcohol amines (e.g., dimetylethanolamine, triethanolamine), quaternary ammonium salts (e.g., tetramethylammonium hydroxide, tetraethylammonium hydroxide, choline) and cyclic amines (e.g., pyrrole, piperidine). In this aqueous solution of an alkali, an alcohol such as isopropyl alcohol and a surfactant such as nonionic surfactant may be added each in an appropriate amount.

Among these developers, preferred are a quaternary ammonium salt, more preferred are tetramethylammonium hydroxide and choline.

The alkali concentration of the alkali developer is usually from 0.1 to 20 mass %.

The pH of the alkali developer is usually from 10.0 to 15.0.

EXAMPLES

The present invention is described in greater detail below by referring to Examples, but the present invention should not be construed as being limited thereto.

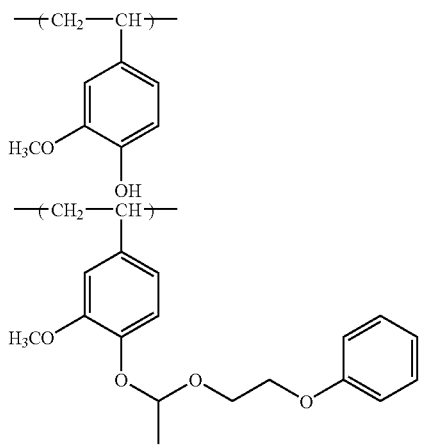

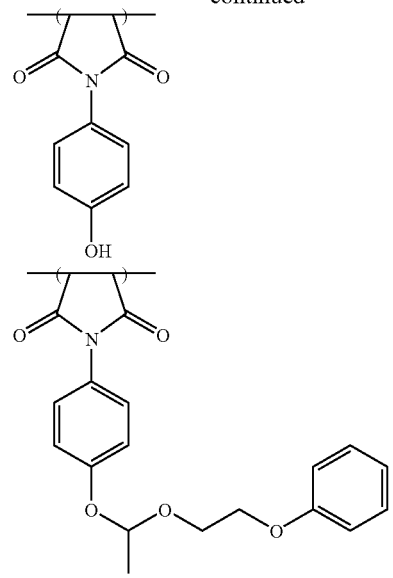

Synthesis Example 1

Synthesis of Polymer A-1a

In a reaction vessel, 111.14 g (0.5 mol) of 3-methoxy-4-(1-ethoxyethoxy)styrene and 94.59 g (0.5 mol) of N-(4-hydroxyphenyl)maleimide were dissolved in 400 ml of tetrahydrofuran. While stirring the resulting solution, a nitrogen gas was passed into the system. Subsequently, 12.42 g (0.05 mol) of polymerization initiator V-65 (produced by Wako Pure Chemical Industries, Ltd.) was added thereto and the reaction solution was heated at 65° C. After stirring under heat for 10 hours by adding V-65 in the same amount as above every one hour, the reaction solution was allowed to cool to room temperature and then added dropwise in 5 L of hexane to precipitate a polymer. The solid obtained by filtration was dissolved in 800 ml of tetrahydrofuran and the resulting solution was again added dropwise in 5 L of hexane. After filtration, the solid obtained was dried under reduced pressure to obtain 181.04 g of a 3-methoxy-4-(1-ethoxyethoxy)styrene/N-(4-hydroxyphenyl)maleimide copolymer.

In a reaction vessel, 180 g of the polymer obtained above, 800 ml of tetrahydrofuran, 100 ml of methanol, 10 ml of distilled water and 1.0 g of p-toluenesulfonic acid were added and stirred at room temperature for 5 hours. Subsequently, the reaction solution was added dropwise in 3 L of distilled water, and the solid obtained by filtration was dissolved in 600 ml of tetrahydrofuran. The resulting solution was again added dropwise in 3 L of distilled water and after filtration, the solid obtained was dried under reduced pressure to obtain 120.5 g of 3-methoxy-4-hydroxystyrene/N-(4-hydroxyphenyl)maleimide copolymer.

In a reaction vessel, 30 g of the polymer obtained above was dissolved in 100 g of propylene glycol monomethyl ether acetate (PGMEA) and the resulting solution was depressurized to 20 mmHg at 60° C. to distill out about 20 g of the solvent together with water remaining in the system. The residue was cooled to 20° C. and after adding 8.71 g of 2-phenoxyethyl vinyl ether and 1.0 g of p-toluenesulfonic acid, stirred at room temperature for 1 hour. Subsequently, 1.16 g of triethylamine was added to effect neutralization and a washing operation of adding 40 g of ethyl acetate and 40 g of water was performed three times. Thereafter, the amount of the solvent was adjusted to obtain a polymer solution of 30 mass %. This polymer was designated as Polymer A-1a. The weight average molecular weight of Polymer A-1a by GPC was 6,600, the molecular weight dispersity was 1.51, and the compositional ratio determined by $^1$H- and $^{13}$C-NMR analyses was 44/6/26/24 from the left in the figure.

Synthesis Example 2

Synthesis of Polymer A-1b

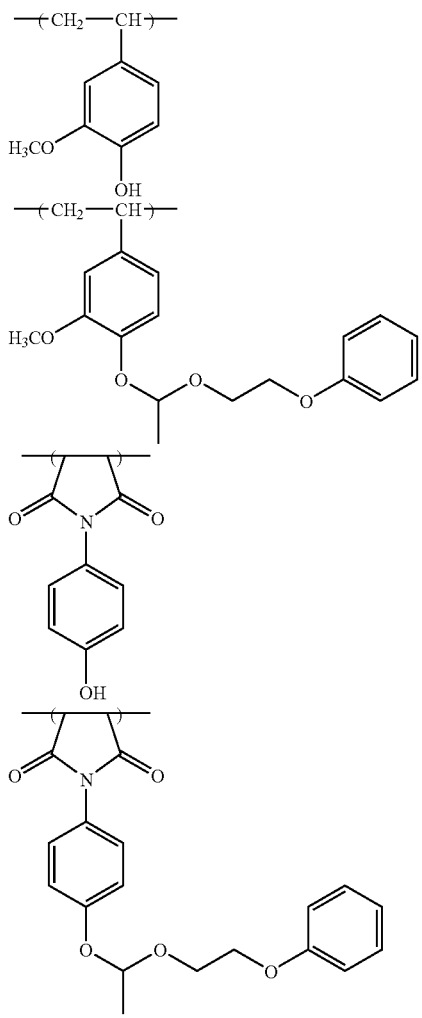

In a reaction vessel, 66.07 g (0.44 mol) of 3-methoxy-4-hydroxystyrene, 18.86 g (0.06 mol) of 3-methoxy-4-[1-(2-phenoxyethoxy)ethoxy]styrene, 49.18 g (0.26 mol) of N-(4-hydroxyphenyl)maleimide and 84.81 g (0.24 mol) of N-[4-(1-(2-phenoxyethoxy)ethoxy)phenyl]maleimide were dissolved in 400 ml of tetrahydrofuran. While stirring the resulting solution, a nitrogen gas was passed into the system. Subsequently, 12.42 g (0.05 mol) of polymerization initiator V-65 (produced by Wako Pure Chemical Industries, Ltd.) was added thereto and the reaction solution was heated at 65° C. After stirring under heat for 10 hours by adding V-65 in the same amount as above every one hour, the reaction solution was allowed to cool to room temperature and then added dropwise in 5 L of hexane to precipitate a polymer. The solid obtained by filtration was dissolved in 800 ml of tetrahydrofuran and the resulting solution was again added dropwise in 5 L of hexane. After filtration, the solid obtained was dried under reduced pressure to obtain 186.08 g of the polymer. The weight average molecular weight of Polymer A-1b by GPC was 7,800, the molecular weight dispersity was 1.49, and the compositional ratio determined by $^1$H- and $^{13}$C-NMR analyses was 44/6/26/24 from the left in the figure.

The raw materials 3-methoxy-4-[1-(2-phenoxyethoxy)ethoxy]styrene and N-[4-(1-(2-phenoxyethoxy)ethoxy)phenyl]maleimide can be synthesized by protecting 3-methoxy-4-hydroxystyrene and N-(4-hydroxyphenyl)maleimide, respectively, with use of 2-phenoxyethyl vinyl ether in a usual manner.

Polymer A-8 was obtained in the same manner as in Synthesis Example 1 or 2 except for changing the monomers and vinyl ether used.

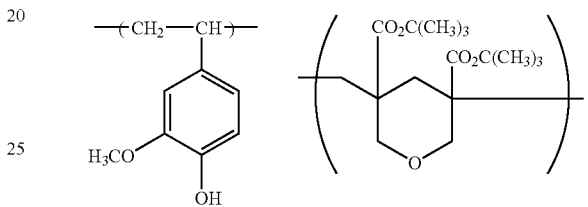

Synthesis Example 3

Synthesis of Polymer A-13

In a reaction vessel, 133.37 g (0.6 mol) of 3-methoxy-4-(1-ethoxyethoxy)styrene and 119.35 g (0.4 mol) of (tert-butyl)-2,2'-[oxybis(methylene)]bis-2-propenoate were dissolved in 700 ml of tetrahydrofuran. While stirring the resulting solution, a nitrogen gas was passed into the system. Subsequently, 6.91 g (0.03 mol) of polymerization initiator V-601 (produced by Wako Pure Chemical Industries, Ltd.) was added thereto and the reaction solution was heated at 65° C. After stirring under heat for 10 hours by adding V-601 in the same amount as above every one hour, the reaction solution was allowed to cool to room temperature and then added dropwise in 5 L of hexane to precipitate a polymer. The solid obtained by filtration was dissolved in 300 ml of tetrahydrofuran and the resulting solution was again added dropwise in 5 L of hexane. After filtration, the solid obtained was dried under reduced pressure to obtain 209.76 g of a 3-methoxy-4-(1-ethoxyethoxy)styrene/(tert-butyl)-2,2'-[oxybis(methylene)]bis-2-propenoate copolymer.

In a reaction vessel, 200 g of the polymer obtained above, 800 ml of tetrahydrofuran, 100 ml of methanol, 10 ml of distilled water and 1.0 g of p-toluenesulfonic acid were added and stirred at room temperature for 5 hours. Subsequently, the reaction solution was added dropwise in 3 L of distilled water, and the solid obtained by filtration was dissolved in 600 ml of tetrahydrofuran. The resulting solution was again added dropwise in 3 L of distilled water and after filtration, the solid obtained was dried under reduced pressure to obtain 157.44 g of Polymer A-13. The weight average molecular weight of Polymer A-13 by GPC was 8,300, the molecular weight dispersity was 1.54, and the compositional ratio determined by $^1$H- and $^{13}$C-NMR analyses was 62/38 from the left in the figure.

The raw material (tert-butyl)-2,2'-[oxybis(methylene)]bis-2-propenoate can be synthesized by using the method described in Examples of JP-A-2000-241976.

Polymers A-2 to A-7, A-9 to A-12, A-14 and A-15 were obtained in the same manner as in Synthesis Example 1, 2 or 3 except for changing the monomers and vinyl ether used.
The structures of Polymers A-1 to A-15 are shown below.
TABLE 1
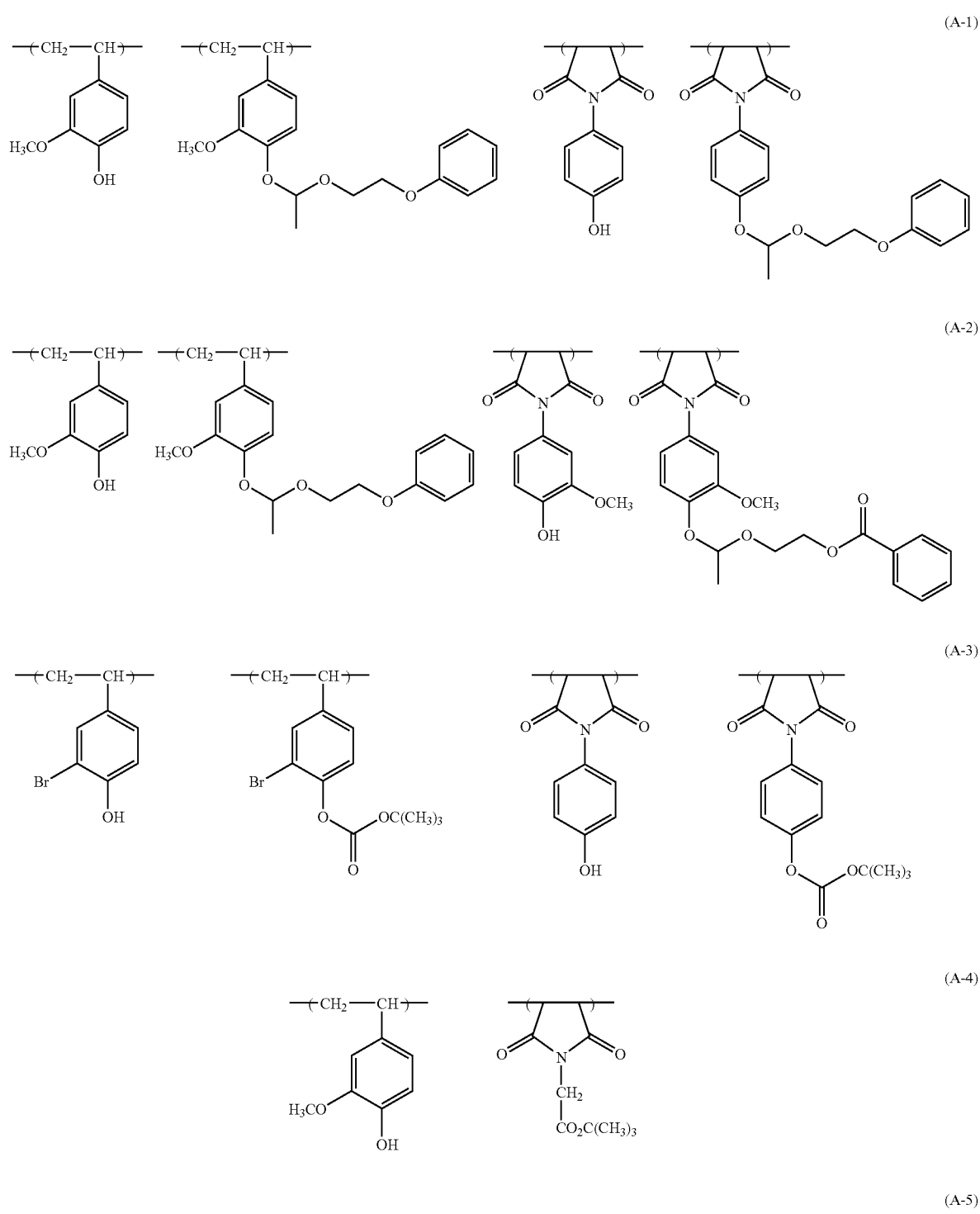

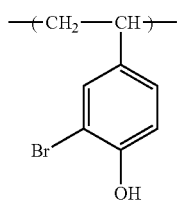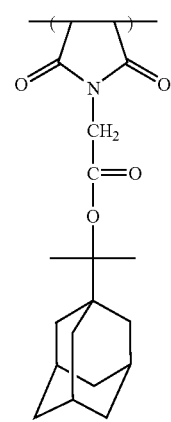
(A-6)
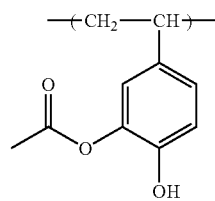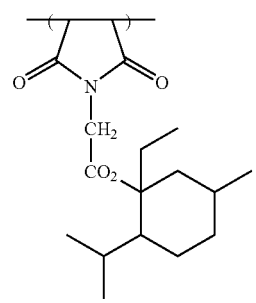
(A-7)
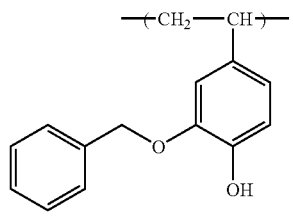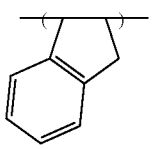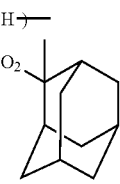
(A-8)
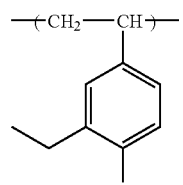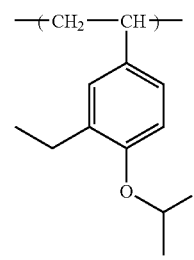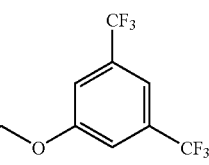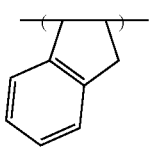
(A-9)
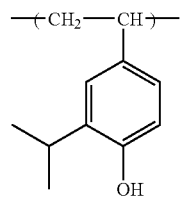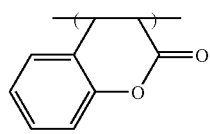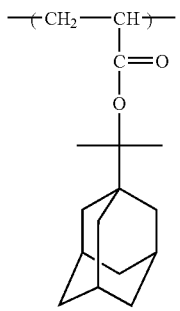
(A-10)

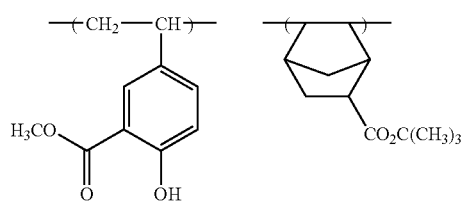
(A-11)
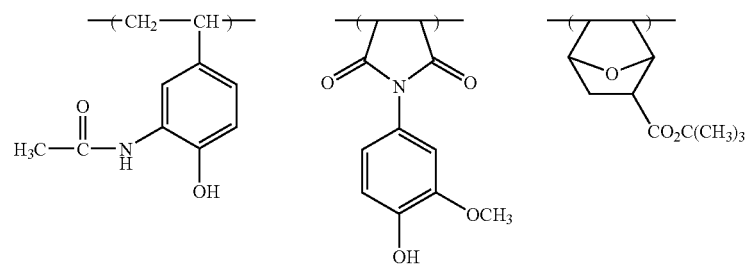
(A-12)
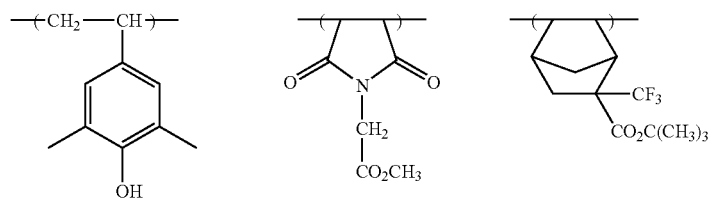
(A-13)
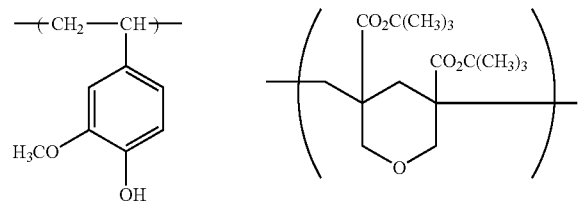
(A-14)
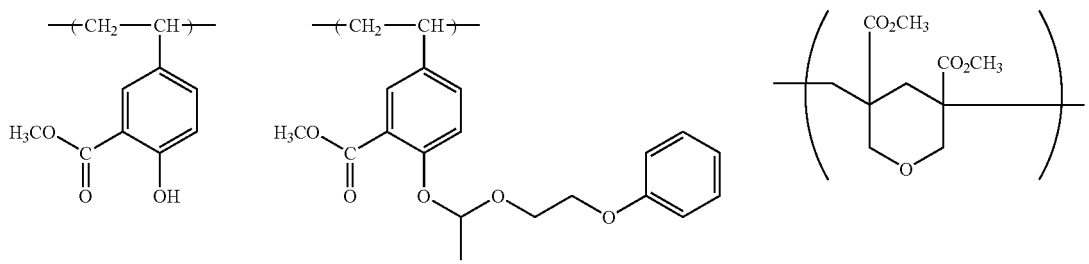
(A-15)
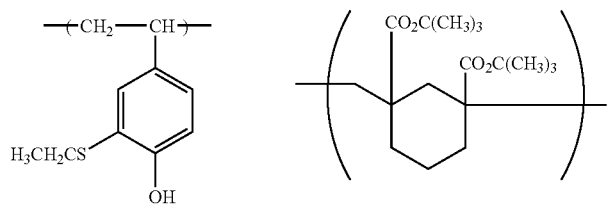
| Polymer | Weight Average Molecular Weight | Molecular Weight Dispersity | Compositional Ratio* |
|---|---|---|---|
| A-1a | 6600 | 1.51 | 44/6/26/24 |
| A-1b | 7800 | 1.49 | 44/6/26/24 |
| A-2 | 8400 | 1.42 | 41/9/24/26 |

| | | | |
|---|---|---|---|
| A-3 | 9900 | 1.65 | 51/7/13/29 |
| A-4 | 8500 | 1.53 | 57/43 |
| A-5 | 3600 | 1.51 | 51/49 |
| A-6 | 8800 | 1.57 | 52/48 |
| A-7 | 3300 | 1.55 | 50/15/35 |
| A-8 | 13700 | 1.43 | 58/24/18 |
| A-9 | 7700 | 1.47 | 55/20/25 |
| A-10 | 5300 | 1.54 | 65/15/20 |
| A-11 | 15800 | 1.48 | 53/17/30 |
| A-12 | 9600 | 1.47 | 55/17/28 |
| A-13 | 8300 | 1.54 | 62/38 |
| A-14 | 8700 | 1.57 | 39/27/34 |
| A-15 | 5400 | 1.53 | 60/40 |

Resins H-1 and H-2 used as the comparative resin are shown below.

Comparative Resin H-1 (Weight Average Molecular Weight: 8,000, Dispersity: 1.50, Compositional Ratio: 34/16/33/17):

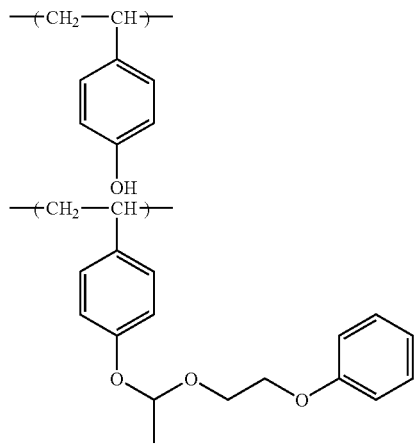

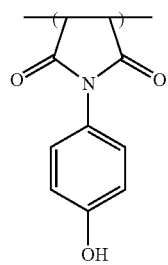

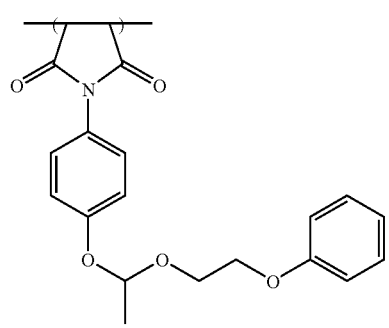

Comparative Resin H-2 (Weight Average Molecular Weight: 8,100, Dispersity: 1.53, Compositional Ratio: 55/25/20):

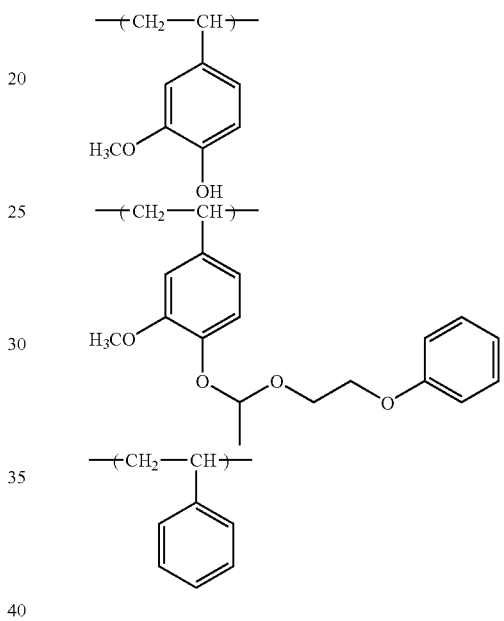

[Preparation of Resist Composition]

| | |
|---|---|
| Resin of the Invention shown in Table 2: | 0.948 g (as solid content) |
| Acid generator: | 0.05 g |
| Organic basic compound: | 0.003 g |
| Surfactant: | 0.002 |

These components were dissolved in 16.79 g of the solvent shown in Table 2 below to prepare a solution having a solid content concentration of 5.0 mass %. This solution was filtered through a 0.1-μm Teflon filter to obtain a positive resist solution.

[Pattern Formation and Evaluation (EB)]

The thus-prepared positive resist solution was uniformly coated on a hexamethyldisilazane-treated silicon wafer by using a spin coater and dried under heat at 120° C. for 90 seconds to form a positive resist film having a film thickness of 0.3 μm. This resist film was then irradiated with electron beams by using an electron beam image-drawing apparatus (HL750, manufactured by Hitachi Ltd., accelerating voltage: 50 KeV). After the irradiation, the resist film was baked at 100° C. for 90 seconds, dipped in an aqueous 2.38 mass % tetramethylammonium hydroxide (TMAH) solution for 60 seconds, rinsed with water for 30 seconds and then dried. The obtained pattern was evaluated by the following methods.

[Sensitivity]

The cross-sectional profile of the pattern obtained was observed by using a scanning electron microscope (S-4300, manufactured by Hitachi, Ltd.). The minimum irradiation energy for resolving a 150-nm line (line:space=1:1) was defined as the sensitivity.

[Resolving Power]

The limiting resolving power (the minimum line width with which the line and space can be obtained as a separated and resolved image) at the irradiation dosage of giving the above-described sensitivity was defined as the resolving power.

[Pattern Profile]

The cross-section of the portion having a line width of 150 nm (line/space=1:1) was observed by SEM (S-8840, manufactured by Hitachi, Ltd.) and evaluated according to the following criteria.

A: When the angle between the pattern side wall and the substrate was 90±2° and at the same time, the angle between the pattern side wall and the pattern surface was 90±2°.

B: When the angle between the pattern side wall and the substrate was from 85° to less than 88° or from 92° to less than 95° and at the same time, the angle between the pattern side wall and the pattern surface was from 85° to less than 880 or from 92° to less than 95°.

C: When the angle between the pattern side wall and the substrate was less than 85° or 95° or more, when a T-top profile was observed, or when the entire pattern surface was rounded.

[Line Edge Roughness (LER)]

With respect to the region of 50 μm in the longitudinal direction of the 150 nm-line pattern at the irradiation dosage of giving the above-described sensitivity, the distance from a reference line where the edge should be present was measured at arbitrary 30 points by using a scanning electron microscope (S-9220, manufactured by Hitachi, Ltd.) and by determining the standard deviation, 30 was calculated and used as an index for LER.

The results are shown in Table 2.

TABLE 2

|  | Resin (A) | Acid Generator (mass ratio) | Basic Compound | Surfactant | Solvent (mass ratio) | Sensitivity (μC/cm$^2$) | Resolving Power (nm) | Pattern Profile | LER (nm) |
|---|---|---|---|---|---|---|---|---|---|
| Example 1 | A-1a | B-1 | N-1 | D-1 | S-1 | 4.5 | 70 | A | 4.2 |
| Example 2 | A-1b | B-1 | N-2 | D-2 | S-1 | 4.5 | 70 | A | 4.2 |
| Example 3 | A-2 | B-1 | N-2 | D-2 | S-1 | 5.5 | 70 | A | 4.5 |
| Example 4 | A-3 | B-1 | N-2 | D-4 | S-1 | 5.5 | 70 | B | 4.4 |
| Example 5 | A-4 | B-1 | N-2 | D-2 | S-1 | 4.5 | 70 | A | 4.1 |
| Example 6 | A-5 | B-1/B-3 (90/10) | N-2 | D-1 | S-1 | 4.5 | 65 | A | 3.8 |
| Example 7 | A-6 | B-2 | N-1 | D-2 | S-1/S-2 (80/20) | 4.5 | 65 | A | 4.0 |
| Example 8 | A-7 | B-2 | N-1 | D-2 | S-1 | 4.5 | 70 | A | 4.2 |
| Example 9 | A-8 | B-2 | N-1 | D-2 | S-1 | 4.5 | 70 | A | 4.1 |
| Example 10 | A-9 | B-2/B-4 (85/15) | N-3 | D-3 | S-1 | 4.5 | 65 | A | 3.9 |
| Example 11 | A-10 | B-2 | N-3 | D-3 | S-1 | 5.0 | 70 | A | 4.4 |
| Example 12 | A-11 | B-2 | N-3 | D-4 | S-1 | 5.5 | 70 | B | 4.5 |
| Example 13 | A-12 | B-2 | N-2 | D-2 | S-1 | 5.5 | 70 | A | 4.4 |
| Example 14 | A-13 | B-2 | N-1 | D-3 | S-1 | 5.5 | 70 | A | 4.6 |
| Example 15 | A-14 | B-1 | N-2 | D-3 | S-1/S-2 (70/30) | 4.5 | 65 | A | 4.0 |
| Example 16 | A-15 | B-1 | N-1 | D-2 | S-1 | 5.5 | 70 | A | 4.4 |
| Comparative Example 1 | H-1 | B-1 | N-1 | D-1 | S-1 | 7.5 | 85 | B | 5.3 |
| Comparative Example 2 | H-2 | B-1 | N-1 | D-1 | S-1 | 8.0 | 80 | C | 4.5 |

The abbreviations in Table 2 are as follows.

B-1:

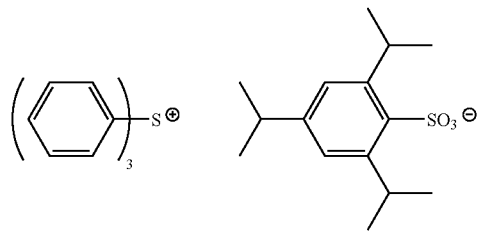

B-2:

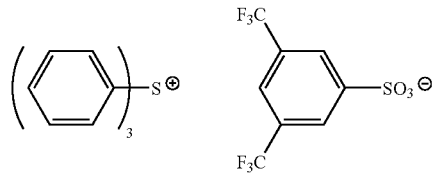

B-3:

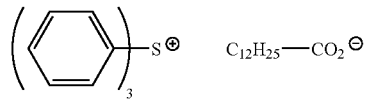

-continued

B-4:

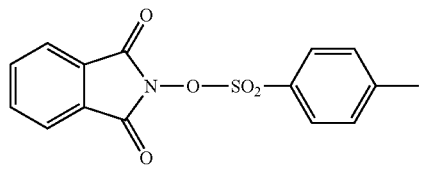

[Surfactant]

D-1: Megafac F176 (produced by Dainippon Ink & Chemicals, Inc.)
D-2: Megafac R08 (produced by Dainippon Ink & Chemicals, Inc.)
D-3: Troysol S-366 (produced by Troy Chemical Industries, Inc.)
D-4: polyoxyethylene lauryl ether

[Solvent]

S-1: propylene glycol monomethyl ether acetate
S-2: propylene glycol monomethyl ether

[Basic Compound]

N-1: trioctylamine
N-2: 1,5-diazabicyclo[4.3.0]-5-nonene
N-3: 2,4,6-triphenylimidazole As seen from the results in Table 2, in the pattern formation by the irradiation of electron beams, the resist composition of the present invention ensures high sensitivity, high resolving power, excellent pattern profile and good line edge roughness as compared with the composition of Comparative Examples.

[Pattern Formation and Evaluation (EUV)]

Using each resist composition of Examples 2, 3, 6 and 7 and Comparative Examples 1 and 2, a resist film was obtained in the same manner as in Example 1. However, the resist film thickness was changed to 0.15 μm. The resist film obtained was subjected to surface exposure by using EUV light (wavelength: 13 nm) while changing the exposure dosage in steps of 0.5 mJ in the range from 0 to 10.0 mJ and then baked at 100° C. for 90 seconds. Thereafter, the dissolution rate at each exposure dosage was measured by using an aqueous 2.38% tetramethylammonium hydroxide (TMAH) solution to obtain a sensitivity curve. The exposure dosage when the dissolution rate of the resist was saturated in this sensitivity curve was defined as the sensitivity and also, the dissolution contrast (γ value) was calculated from the gradient of the straight line part in the sensitivity curve. As the γ value is larger, the dissolution contrast is more excellent. These results are shown in Table 3 as Examples 17 to 20 and Comparative Examples 3 and 4, respectively.

As seen from the results in Table 3, in the characteristic evaluation by the irradiation of EUV light, the resist composition of the present invention ensures high sensitivity and high contrast and is superior to the composition of Comparative Examples.

TABLE 3

|  | Sensitivity (mJ/cm$^2$) | γ Value |
| --- | --- | --- |
| Example 17 | 2.0 | 9.8 |
| Example 18 | 2.5 | 9.3 |
| Example 19 | 2.0 | 10.7 |
| Example 20 | 2.0 | 10.6 |

TABLE 3-continued

|  | Sensitivity (mJ/cm$^2$) | γ Value |
| --- | --- | --- |
| Comparative Example 3 | 4.5 | 8.9 |
| Comparative Example 4 | 5.5 | 7.7 |

As seen from the results in Table 3, in the characteristic evaluation by the irradiation of EUV light, the resist composition of the present invention ensures high sensitivity and high contrast and is superior to the composition of Comparative Examples.

This application is based on Japanese patent application JP 2004-278320, filed on Sep. 24, 2004, the entire content of which is hereby incorporated by reference, the same as if set forth at length.

What is claimed is:

1. A positive resist composition comprising: (A) a resin of which solubility in an alkali developer increases under the action of an acid, the resin containing a repeating unit represented by formula (I) and a repeating unit having a cyclic structure in the main chain selected from the group consisting of formulae (IIa), (IIb), (IId1) and (IIe); and (B) a compound capable of generating an acid upon irradiation with actinic rays or radiation:

(I)

wherein
$R_1$ represents a hydrogen atom, a methyl group, a cyano group, a halogen atom or a perfluoro group,
$R_2$ represents a non-acid-decomposable group, and when n represents an integer of 2 to 4, a plurality of $R_2$s may be the same or different,
X represents a hydrogen atom or an organic group, and when m represents an integer of 2 to 4, a plurality of Xs may be the same or different,
m represents an integer of 1 to 4, and
n represents an integer of 1 to 4, provided that 2≦n+m≦5; and wherein formulae (IIa), (IIb), (IId1) and (IIe) have the following structures:

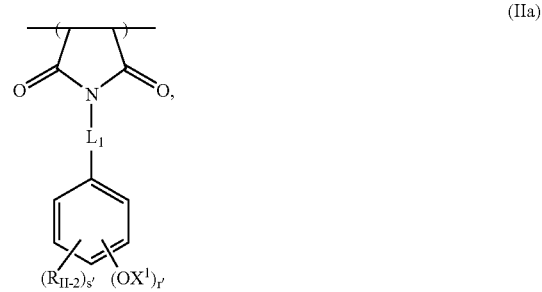

(IIa)

-continued

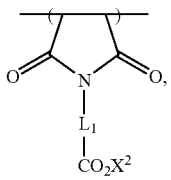
(IIb)

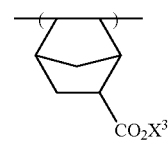
(IId1)

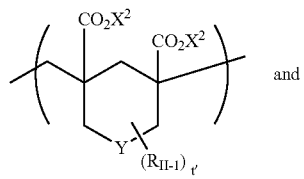
(IIe)

and wherein
$R_{II-1}$ and $R_{II-2}$ each independently represents an alkyl group, a cycloalkyl group, a halogen atom, an aryl group, an aralkyl group, an alkoxy group or an acyloxy group, and said alkyl group and said aralkyl group each may have an intervening linking group represented by —O—, —S—, —CO$_2$—, —CO—, —SO$_2$— or —SO—, and when p' or t' each represents an integer of 2 to 6 or 2 to 4, respectively, a plurality of $R_{II-1}$s may be the same or different, and when s' or t' represents an integer of 2 to 5 or 2 to 4, respectively, a plurality of $R_{II-2}$s may be the same or different, and a plurality of $R_{II-1}$s or a plurality of $R_{II-2}$s may combine with each other to form a ring structure, $L_1$ represents a single bond or a divalent linking group selected from the group consisting of an alkylene group, a cycloalkylene group, an alkenylene group, an arylene group, —O—, —S—, —O—$R_{22a}$—, —O—C(=O)—$R_{22b}$—, —C(=O)—O—$R_{22c}$— and —C(=O)—N($R_{22d}$)—$R_{22e}$—; $R_{22a}$, $R_{22b}$, $R_{22c}$ and $R_{22e}$ each represents a single bond or a divalent alkylene, cycloalkylene, alkenylene or arylene group which may have an ether group, an ester group, an amido group, a urethane group or a ureido group; $R_{22d}$ represents a hydrogen atom, an alkyl group, a cycloalkyl group, an aralkyl group or an aryl group, $X^1$, $X^2$ and $X^3$ each independently represents a hydrogen atom or an organic group, and when r represents an integer of 2 to 5, a plurality of $X^1$s may be the same or different, and when q' represents an integer of 2 to 4, a plurality of $X^2$s may be the same or different, $Y_5$ represents a linking group represented by —O—, —S— or —C($R_m$)($R_n$)—, and $R_m$ and $R_n$ each independently represents an alkyl group, a cycloalkyl group, a halogen atom, an aryl group, an aralkyl group, an alkoxy group or an acyloxy group, and said alkyl group and said aralkyl group each may have an intervening linking group represented by —O—, —S—, —CO$_2$—, —CO—, —SO$_2$— or —SO—, r' represents an integer of 0 to 5, s' represents an integer of 0 to 5, and t' each independently represents an integer of 0 to 4, provided that r'+s' is 5 or less.

2. The positive resist composition as claimed in claim 1, wherein the repeating unit represented by formula (I) is a repeating unit represented by formula (Ia):

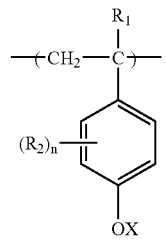
(Ia)

wherein
$R_1$ represents a hydrogen atom, a methyl group, a cyano group, a halogen atom or a perfluoro group,
$R_2$ represents a non-acid-decomposable group,
X represents a hydrogen atom or an organic group, and
n represents an integer of 1 to 4, and when n is an integer of 2 to 4, a plurality of $R_2$s may be the same or different.

3. The positive resist composition as claimed in claim 1, wherein the repeating unit represented by formula (I) is a repeating unit represented by formula (Ib):

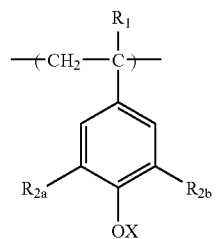
(Ib)

wherein
$R_1$ represents a hydrogen atom, a methyl group, a cyano group, a halogen atom or a perfluoro group,
X represents a hydrogen atom or an organic group, and
$R_{2a}$ and $R_{2b}$ each independently represents a hydrogen atom or a non-acid-decomposable group, provided that at least one of $R_{2a}$ and $R_{2b}$ is a non-acid-decomposable group.

4. The positive resist composition as claimed in claim 1, wherein the non-acid-decomposable group represented by $R_2$ in formula (I) contains an oxygen atom.

5. The positive resist composition as claimed in claim 1, wherein the non-acid-decomposable group represented by $R_2$ in formula (I) contains a halogen atom.

6. The positive resist composition as claimed in claim 1, wherein the repeating unit represented by formula (IIa), (IIb), or (IIe) is a repeating unit represented by any one of formulae (IIa1), (IIb1), and (IIe1):

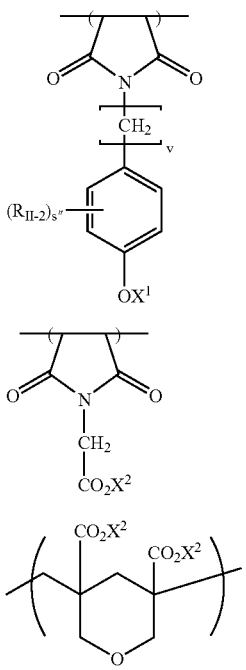

(IIa1)

(IIb1)

(IIe1)

wherein

R$_{II-2}$ each independently represents an alkyl group, a cycloalkyl group, a halogen atom, an aryl group, an aralkyl group, an alkoxy group or an acyloxy group, and said alkyl group and said aralkyl group each may have an intervening linking group represented by —O—, —S—, —CO$_2$—, —CO—, —SO$_2$— or —SO—, and when s" represents an integer of 2 to 4, a plurality of R$_{II-2}$s may be the same or difference, and a plurality of R$_{II-2}$s may combine with each other to form a ring structure, X$^1$ and X$^2$ each independently represents a hydrogen atom or an organic group, v represents 0 or 1, and s" represents an integer of 0 to 4.

7. The positive resist composition as claimed in claim 1, wherein the resin (A) further contains a repeating unit represented by formula (III):

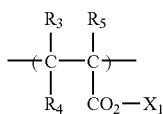

(III)

wherein

R$_3$ to R$_5$ each independently represents a hydrogen atom, a fluorine atom, a chlorine atom, a cyano group or an alkyl group, and X$_1$ represents a hydrogen atom or an organic group.

8. The positive resist composition as claimed in claim 1, wherein at least one of X in formula (I) contains an alicyclic structure and an aromatic ring structure or both an alicyclic structure and an aromatic ring structure.

9. The positive resist composition as claimed in claim 1, wherein the non-acid-decomposable group represented by R$_2$ in formula (I) is an alkoxy group.

10. The positive resist composition as claimed in claim 1, which further comprises a surfactant.

11. The positive resist composition as claimed in claim 1, wherein the compound (B) includes (B1) a compound of generating an organic sulfonic acid under the action of actinic rays or radiation.

12. The positive resist composition as claimed in claim 11, which further comprises (B2) a compound of generating a carboxylic acid under the action of actinic rays or radiation.

13. The positive resist composition as claimed in claim 1, which further comprises a solvent.

14. The positive resist composition as claimed in claim 13, wherein the solvent includes a propylene glycol monomethyl ether acetate.

15. The positive resist composition as claimed in claim 14, wherein the solvent further includes a propylene glycol monomethyl ether.

16. The positive resist composition as claimed in claim 1, wherein the actinic rays or radiation is selected from the group consisting of electron beam, X-ray or EUV.

17. A pattern forming method comprising forming a resist film by using the positive resist composition claimed in claim 1; and exposing and developing said resist film.

18. A positive resist composition comprising: (A) a resin of which solubility in an alkali developer increases under the action of an acid, the resin containing a repeating unit represented by formula (I) and a repeating unit represented by formula (IIc); and (B) a compound capable of generating an acid upon irradiation with actinic rays or radiation:

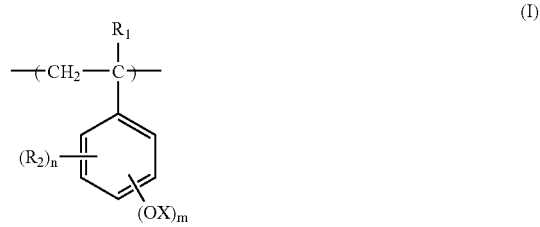

(I)

wherein

R$_1$ represents a hydrogen atom, a methyl group, a cyano group, a halogen atom or a perfluoro group, R$_2$ represents a non-acid-decomposable group which contains an oxygen atom, and when n represents an integer of 2 to 4, a plurality of R$_2$s may be the same or different, X represents a hydrogen atom or an organic group, and when m represents an integer of 2 to 4, a plurality of Xs may be the same or different, m represents an integer of 1 to 4, and n represents an integer of 1 to 4, provided that 2≦n+m≦5;

wherein formula (IIc) has the following structure:

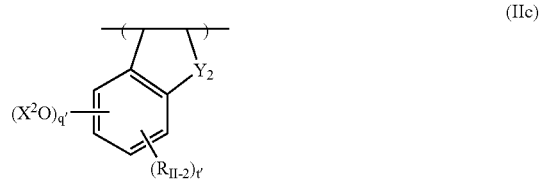

(IIc)

wherein

R$_{II-2}$ represents an alkyl group, a cycloalkyl group, a halogen atom, an aryl group, an aralkyl group, an alkoxy group or an acyloxy group, and said alkyl group and said aralkyl group each may have an intervening linking group represented by —O—, —S—, —$CO_2$—, —CO—, —$SO_2$— or —SO—, and when t' represents an integer 2 to 4, a plurality of $R_{II\text{-}2}$s may be the same or different, and a plurality of $R_{II\text{-}2}$s may combine with each other to form a ring structure, $X^2$ represents a hydrogen atom or an organic group, and when q' represents an integer of 2 to 4, a plurality of $X^2$s may be the same or different, $Y_2$ represents a divalent linking group, and $R_{II\text{-}2}$ and $Y_2$ may combine to form a ring structure, q' represents an integer of 0 to 4, and t' represents an integer of 0 to 4.

19. The positive resist composition as claimed in claim 1, wherein at least one of $X^1$ in formula (IIa) contains an alicyclic structure, an aromatic ring structure, or both of an alicyclic structure and an aromatic ring structure;

$X^2$ in formula (IIb) contains an alicyclic structure, an aromatic ring structure, or both of an alicyclic structure and an aromatic ring structure;

$X^3$ in formula (IId1) contains an alicyclic structure, an aromatic ring structure, or both of an alicyclic structure and an aromatic ring structure; and at least one of $X^2$ in formula (IIe) contains an alicyclic structure, an aromatic ring structure, or both of an alicyclic structure and an aromatic ring structure.

20. The positive resist composition as claimed in claim 7, wherein $X^1$ in formula (III) contains an alicyclic structure, an aromatic ring structure, or both an alicyclic structure and an aromatic ring structure.

* * * * *